(12) United States Patent
Kubota et al.

(10) Patent No.: US 10,630,981 B2
(45) Date of Patent: Apr. 21, 2020

(54) MOVING IMAGE ENCODING APPARATUS AND MOVING IMAGE ENCODING METHOD

(71) Applicant: FUJITSU LIMITED, Kawasaki-shi, Kanagawa (JP)

(72) Inventors: Tomonori Kubota, Kawasaki (JP); Yasuyuki Murata, Shizuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/134,383

(22) Filed: Sep. 18, 2018

(65) Prior Publication Data
US 2019/0098306 A1    Mar. 28, 2019

(30) Foreign Application Priority Data
Sep. 26, 2017   (JP) .................................. 2017-184583

(51) Int. Cl.
| | |
|---|---|
| H04N 19/122 | (2014.01) |
| H04N 19/159 | (2014.01) |
| H04N 19/137 | (2014.01) |
| H04N 19/176 | (2014.01) |
| H04N 19/192 | (2014.01) |
| H04N 19/119 | (2014.01) |
| H04N 19/147 | (2014.01) |
| H04N 19/61 | (2014.01) |

(52) U.S. Cl.
CPC ......... *H04N 19/122* (2014.11); *H04N 19/119* (2014.11); *H04N 19/137* (2014.11); *H04N 19/147* (2014.11); *H04N 19/159* (2014.11); *H04N 19/176* (2014.11); *H04N 19/192* (2014.11); *H04N 19/619* (2014.11)

(58) Field of Classification Search
None
See application file for complete search history.

(56) References Cited

U.S. PATENT DOCUMENTS

| | | | |
|---|---|---|---|
| 10,080,036 B2 * | 9/2018 | Kwong ................. | H04N 19/19 |
| 2006/0203916 A1 * | 9/2006 | Chandramouly .... | H04N 19/176 375/240.24 |
| 2007/0286284 A1 * | 12/2007 | Ito ......................... | H04N 19/51 375/240.16 |

(Continued)

FOREIGN PATENT DOCUMENTS

JP    2010-283495    12/2010

*Primary Examiner* — Reza Aghevli
(74) *Attorney, Agent, or Firm* — Fujitsu Patent Center

(57) ABSTRACT

A moving image encoding apparatus includes one or more processors configured to calculate encoding costs regarding each of a plurality of blocks having different block sizes on the basis of differences between original images of the plurality of blocks and specific prediction images of the plurality of blocks respectively wherein the plurality of blocks is defined by recursively dividing an encoding target image included in a moving image, perform a selection of a first block size in a first hierarchy among the plurality of hierarchies by comparing the encoding costs with each other, perform a selection of a first intra-prediction mode for a first block having the first block size, and encode the first block on the basis of a difference between a first prediction image of the first block generated by the first intra-prediction mode and a first original image of the first block.

12 Claims, 26 Drawing Sheets

(56) References Cited

U.S. PATENT DOCUMENTS

| | | | |
|---|---|---|---|
| 2008/0008238 A1* | 1/2008 | Song | H04N 19/105 |
| | | | 375/240.11 |
| 2009/0297053 A1* | 12/2009 | Nakamura | H04N 19/176 |
| | | | 382/238 |
| 2010/0309978 A1 | 12/2010 | Shimada | |
| 2012/0121013 A1* | 5/2012 | Lainema | H04N 19/61 |
| | | | 375/240.12 |
| 2013/0034154 A1* | 2/2013 | Song | H04N 19/176 |
| | | | 375/240.03 |
| 2013/0266232 A1* | 10/2013 | Sato | G06T 9/004 |
| | | | 382/233 |
| 2013/0279577 A1* | 10/2013 | Schwarz | H04N 19/50 |
| | | | 375/240.12 |
| 2013/0301704 A1* | 11/2013 | Srinivasan | H04N 19/136 |
| | | | 375/240.02 |
| 2016/0373741 A1* | 12/2016 | Zhao | H04N 19/70 |
| 2016/0373742 A1* | 12/2016 | Zhao | H04N 19/147 |
| 2016/0373743 A1* | 12/2016 | Zhao | H04N 19/11 |
| 2016/0373769 A1* | 12/2016 | Zhao | H04N 19/176 |
| 2016/0373770 A1* | 12/2016 | Zhao | H04N 19/124 |
| 2016/0373782 A1* | 12/2016 | Zhao | H04N 19/176 |
| 2017/0201767 A1* | 7/2017 | Shimada | H04N 19/198 |
| 2019/0149821 A1* | 5/2019 | Moon | H04N 19/119 |
| 2019/0281267 A1* | 9/2019 | Fuchie | H04N 5/77 |

\* cited by examiner

FIG. 14

| A | 2A | k |
|---|----|----|
| 4 | 8  | 2 |
| 8 | 16 | 4 |
| 16| 32 | 8 |
| 32| 64 | 16|

FIG. 17A

| 0 | 1 | 4 | 5 | 16 | 17 | 20 | 21 |
|---|---|---|---|----|----|----|----|
| 2 | 3 | 6 | 7 | 18 | 19 | 22 | 23 |
| 8 | 9 | 12 | 13 | 24 | 25 | 28 | 29 |
| 10 | 11 | 14 | 15 | 26 | 27 | 30 | 31 |
| 32 | 33 | 36 | 37 | 48 | 49 | 52 | 53 |
| 34 | 35 | 38 | 39 | 50 | 51 | 54 | 55 |
| 40 | 41 | 44 | 45 | 56 | 57 | 60 | 61 |
| 42 | 43 | 46 | 47 | 58 | 59 | 62 | 63 |

FIG. 17B

| 0 | 1 | 4 | 5 | 16 | 17 | 20 | 21 |
|---|---|---|---|----|----|----|----|
| 2 | 3 | 6 | 7 | 18 | 19 | 22 | 23 |
| 8 | 9 | 12 | 13 | 24 | 25 | 28 | 29 |
| 10 | 11 | 14 | 15 | 26 | 27 | 30 | 31 |
| 32 | 33 | 36 | 37 | 48 | 49 | 52 | 53 |
| 34 | 35 | 38 | 39 | 50 | 51 | 54 | 55 |
| 40 | 41 | 44 | 45 | 56 | 57 | 60 | 61 |
| 42 | 43 | 46 | 47 | 58 | 59 | 62 | 63 |

MOVING IMAGE ENCODING APPARATUS AND MOVING IMAGE ENCODING METHOD

CROSS-REFERENCE TO RELATED APPLICATION

This application is based upon and claims the benefit of priority of the prior Japanese Patent Application No. 2017-184583, filed on Sep. 26, 2017, the entire contents of which are incorporated herein by reference.

FIELD

The embodiments discussed herein are related to a moving image encoding technique.

BACKGROUND

According to the High Efficiency Video Coding (HEVC) as one of standards for moving image encoding, a prediction method is determined for each block referred to as prediction unit (PU). The block size of the PU is specified depending in each of a plurality of hierarchies in a quadtree division structure. A moving image encoding apparatus determines an optimum intra-prediction mode in each of the hierarchies of quadtree division, and compares the optimum intra-prediction modes in the hierarchies with each other to determine optimum PU division.

A moving image encoding apparatus that selects the block size based on a first evaluation value based on a sum of absolute difference values of sub blocks and a second evaluation value based on a sum of absolute values of orthogonal transformation coefficients of sub blocks after the orthogonal transformation of an original image has been known. For example, Japanese Laid-open Patent Publication No. 2010-283495 discloses related art.

SUMMARY

According to an aspect of the invention, a moving image encoding apparatus includes one or more processors configured to calculate encoding costs regarding each of a plurality of blocks having different block sizes on the basis of differences between original images of the plurality of blocks and specific prediction images of the plurality of blocks respectively wherein the plurality of blocks is defined by recursively dividing an encoding target image included in a moving image, perform a selection of a first block size in a first hierarchy among the plurality of hierarchies by comparing the encoding costs with each other, perform a selection of a first intra-prediction mode for a first block having the first block size, and encode the first block on the basis of a difference between a first prediction image of the first block generated by the first intra-prediction mode and a first original image of the first block.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a view illustrating the number of additional values;
FIGS. 17A and 17B are views illustrating the order of accessing data.

DESCRIPTION OF EMBODIMENTS

According to the conventional technique, in the case where the encoding cost is calculated in each of 35 types of intra-prediction modes in each of the plurality of hierarchies of the quadtree division according to the HEVC, and the calculated encoding costs are compared with each other to determine the optimum hierarchy, the number of times the encoding cost is calculated increases. When the number of times of calculations of the encoding cost with a large computation amount increases, processing time for determining the optimum hierarchy is extended.

Such problem occurs in the moving image encoding employing the quadtree division according to the HEVC, as well as other types of moving image encoding employing the block division based on the block size specified in a plurality of hierarchies.

Embodiments will be described below with reference to figures.

Figure 1:
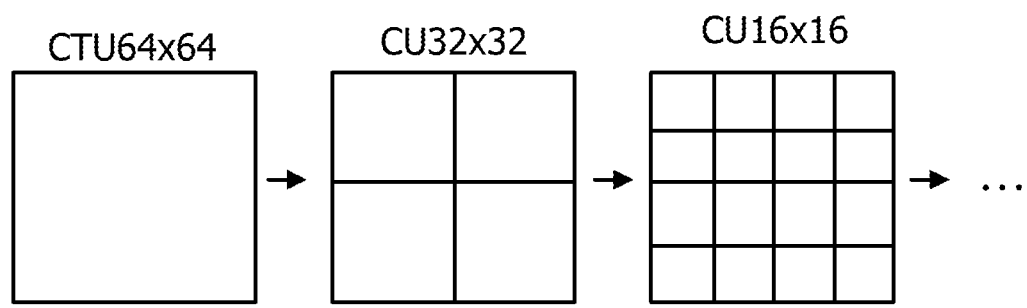
FIG. 1 is a view illustrating quadtree division.

FIG. 1 illustrates exemplary quadtree division according to the HEVC. According to the HEVC, an encoding target image included in a moving image is divided into blocks referred to as coding tree unit (CTU), and each CTU is divided into blocks referred to as coding unit (CU) by recursive quadtree division. A series of encoding processing such as inter-prediction, intra-prediction, orthogonal transformation, quantization, and entropy encoding is executed in units of CU. Hereinafter, the block size of n pixel×n pixel (n is an integer of 1 or more) may be merely described as n×n.

For example, a 64×64 CTU is divided into four 32×32 CUs by quadtree division, and a 32×32 CU is further divided into four 16×16 CUs. A 32×32 CU is further divided into four 16×16 CUs, and a 16×16 CU is further divided into four 8×8 CUs. A minimum value of the block size of CU may be designated in a range of 8×8 to the block size of CTU.

Each CU is encoded by an inter-prediction encoding method or an intra-prediction encoding method. The inter-prediction encoding is an encoding method of encoding an encoding target image using an encoded image, and the intra-prediction encoding is an encoding method of encoding an encoding target image using only information on the encoding target image.

Each CU is divided into blocks referred to as PU, and is also divided into blocks referred to as transform unit (TU) by the recursive quadtree division. The inter-prediction and the intra-prediction are performed in units of PU, and the orthogonal transformation and quantization are performed in units of TU.

Figure 2:
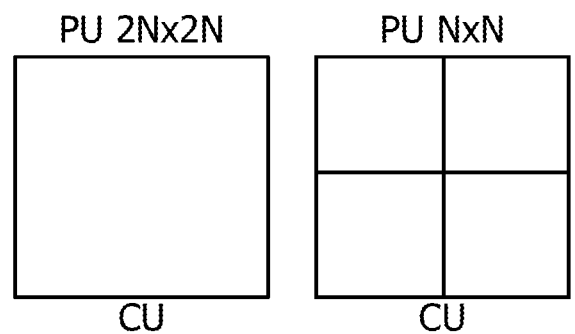
FIG. 2 is a view illustrating a PU in intra-prediction encoding.

FIG. 2 illustrates an exemplary PU in the intra-prediction encoding. In the intra-prediction encoding, for a 2N×2N (N=32, 16, 8, 4) CU, a 2N×2N PU that is the same as the CU, or a N×N PU that is smaller than the CU may be selected. However, the N×N PU may be selected only to the smallest CU. Accordingly, the block size of the PU in the intra-prediction encoding is 64×64, 32×32, 16×16, 8×8, or 4×4.

Meanwhile, the block size of the TU is 32×32, 16×16, 8×8, or 4×4.

In the moving image encoding, an encoding amount (bit amount) generated in the encoding processing may be minimized using an encoding cost referred to as rate-distortion (RD) cost indicating the magnitude of the bit amount generated by a difference (encoding distortion) between an original image and a predicted image. In this case, the RD costs of a plurality of prediction methods are calculated for each PU, and the prediction method having the minimum RD cost is selected. A RD cost C is calculated by, for example, a following equation.

$$C = D + \lambda \times R \quad (1)$$

D in Equation (1) denotes the difference between the original image and the predicted image, and R denotes the bit amount generated when a syntax is encoded. λ denotes a transformation coefficient determined based on quantization parameter (QP). Examples of D include sum of absolute differences (SAD) and sum of absolute transformed differences (SATD).

Figure 3:
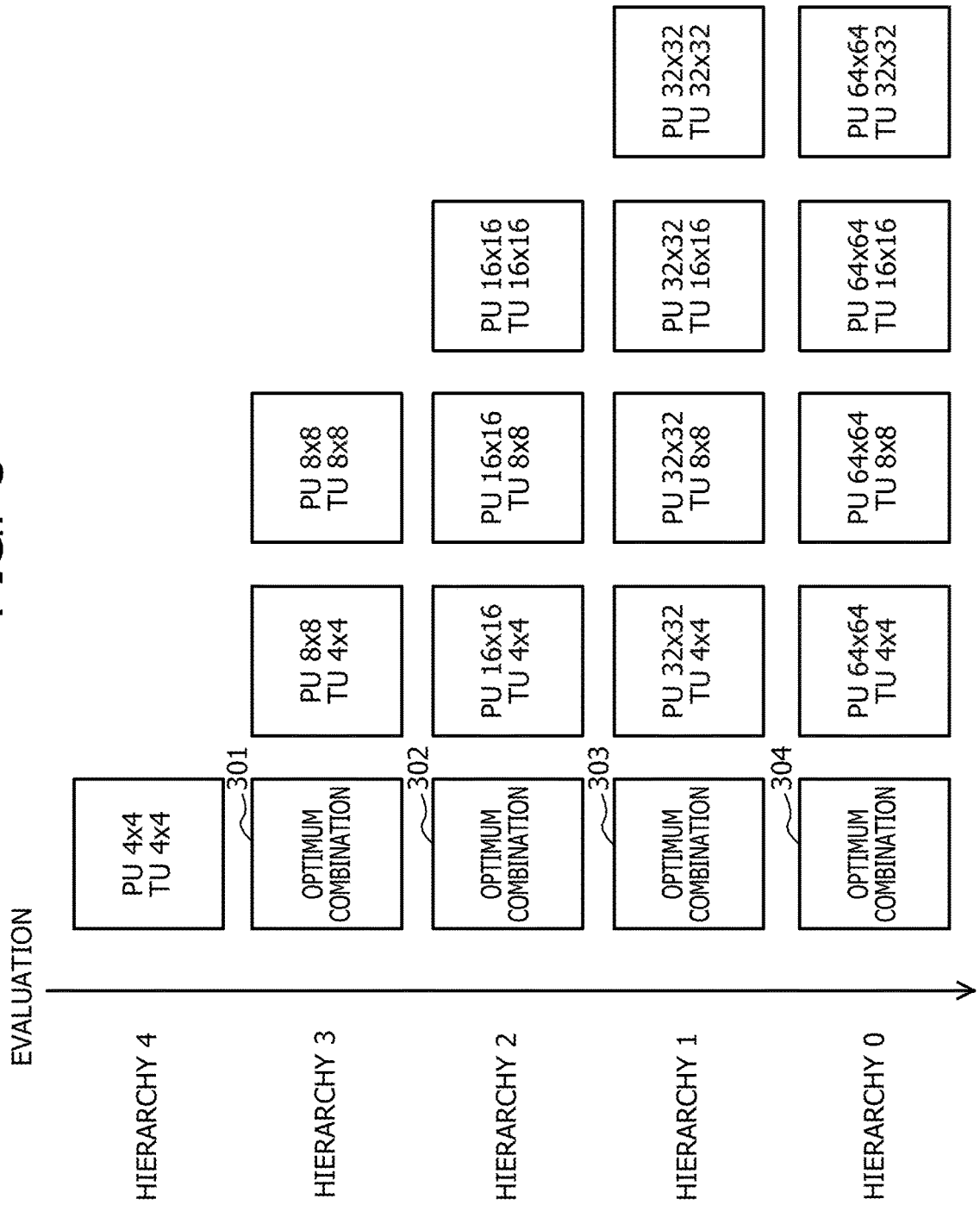
FIG. 3 is a view illustrating a method of evaluating an RD cost.

FIG. 3 illustrates an exemplary method of evaluating the RD cost in the intra-prediction encoding. In this example, the block size of the CTU is 64×64, and a moving image encoding apparatus calculates the RD cost for each combination of the block size of the PU and the block size of the TU in each of a hierarchy 0 to a hierarchy 4 of the quadtree division. Then, the moving image encoding apparatus compares minimum RD costs in the hierarchies with each other to determine an optimum hierarchy of the quadtree division.

The block size of the CU in each of the hierarchy 0 to the hierarchy 3 is as follows: the hierarchy 0: 64×64, the hierarchy 1: 32×32, the hierarchy 2: 16×16, and the hierarchy 3: 8×8

In this case, in the hierarchy 0, the block size of the PU is 64×64, and the block size of the TU is 32×32, 16×16, 8×8, or 4×4. In the hierarchy 1, the block size of the PU is 32×32, and the block size of the TU is 32×32, 16×16, 8×8, or 4×4. In the hierarchy 2, the block size of the PU is 16×16, and the block size of the TU is 16×16, 8×8, or 4×4. In the hierarchy 3, the block size of the PU is 8×8, and the block size of the TU is 8×8 or 4×4.

In the hierarchy 4, 4×4 PU is selected for the CU in the hierarchy 3. In this case, 4×4 is selected as the block size of the TU.

First, the moving image encoding apparatus calculates the RD cost in each of 35 types of intra-prediction modes for the combination of the 4×4 PU and the 4×4 TU in the hierarchy 4, and finds a minimum RD cost for the combination. Then, the moving image encoding apparatus employs the combination of the 4×4 PU and the 4×4 TU as an optimum combination 301.

Next, the moving image encoding apparatus calculates the RD cost in each of the 35 types of intra-prediction modes for each of the combinations of the PU and the TU in the hierarchy 3, and finds a minimum RD cost for the combinations. Then, the moving image encoding apparatus uses the combination having a smaller RD cost in the optimum combination 301 and the combination having the minimum RD cost in the hierarchy 3, as an optimum combination 302.

By sequentially performing such evaluation from the hierarchy 4 to the hierarchy 0, the optimum hierarchy, the optimum combination of the PU and the TU, and the optimum intra-prediction mode are determined based on the optimum combination 301 to an optimum combination 304. In this case, the RD cost is calculated a number of times that is the same as the number of intra-prediction modes (35), for each of the combinations of the PU and the TU in each hierarchy. In this manner, as the number of times the RD with a large computation amount is calculated increases, the processing time for determining the optimum hierarchy also increases.

Figure 4:
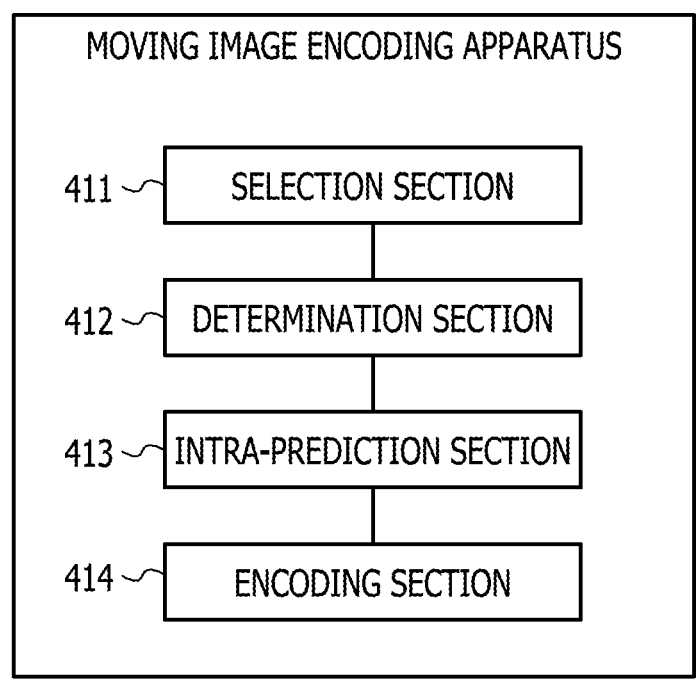
FIG. 4 is a view illustration an exemplary functional configuration of a moving image encoding apparatus.

FIG. 4 illustrates an exemplary functional configuration of the moving image encoding apparatus according to the embodiment. A moving image encoding apparatus 401 in FIG. 4 includes a selection section 411, a determination section 412, an intra-prediction section 413, and an encoding section 414.

Figure 5:
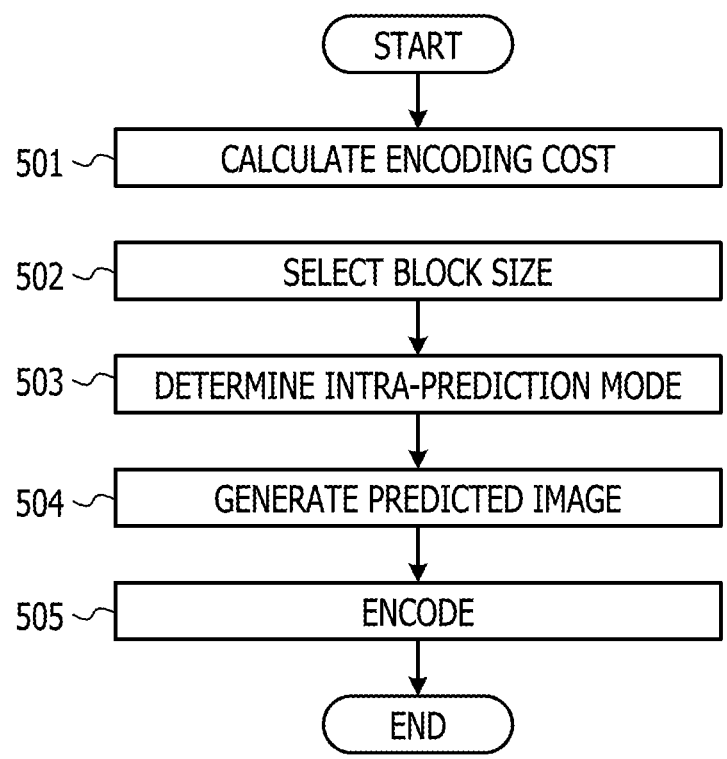
FIG. 5 is a flow chart of moving image encoding processing.

FIG. 5 is a flow chart of an exemplary moving image encoding processing executed by the moving image encoding apparatus 401 in FIG. 4. First, the selection section 411 recursively calculates the encoding cost for each of a plurality of blocks having different block sizes, which are acquired by recursively dividing an encoding target area of an encoding target image included in a moving image in each of a plurality of hierarchies (Step 501). The calculated encoding cost is an encoding cost based on a difference between the original image of the block and a predetermined predicted image. Then, the selection section 411 compares the encoding costs of the plurality of blocks with each other, and selects the block size in one of the plurality of hierarchies (Step 502).

Next, the determination section 412 determines an intra-prediction mode for an encoding target block having the block size selected by the selection section 411 (Step 503). Next, the intra-prediction section 413 generates the predicted image for the encoding target block based on the intra-prediction mode determined by the determination section 412 (Step 504). Then, using the predicted image generated by the intra-prediction section 413, the encoding section 414 encodes the encoding target block (Step 505).

The moving image encoding apparatus 401 in FIG. 4 may reduce the computation amount for determining the block division in the intra-prediction mode, in the moving image encoding using the block size specified in the plurality of hierarchies.

Figure 6:
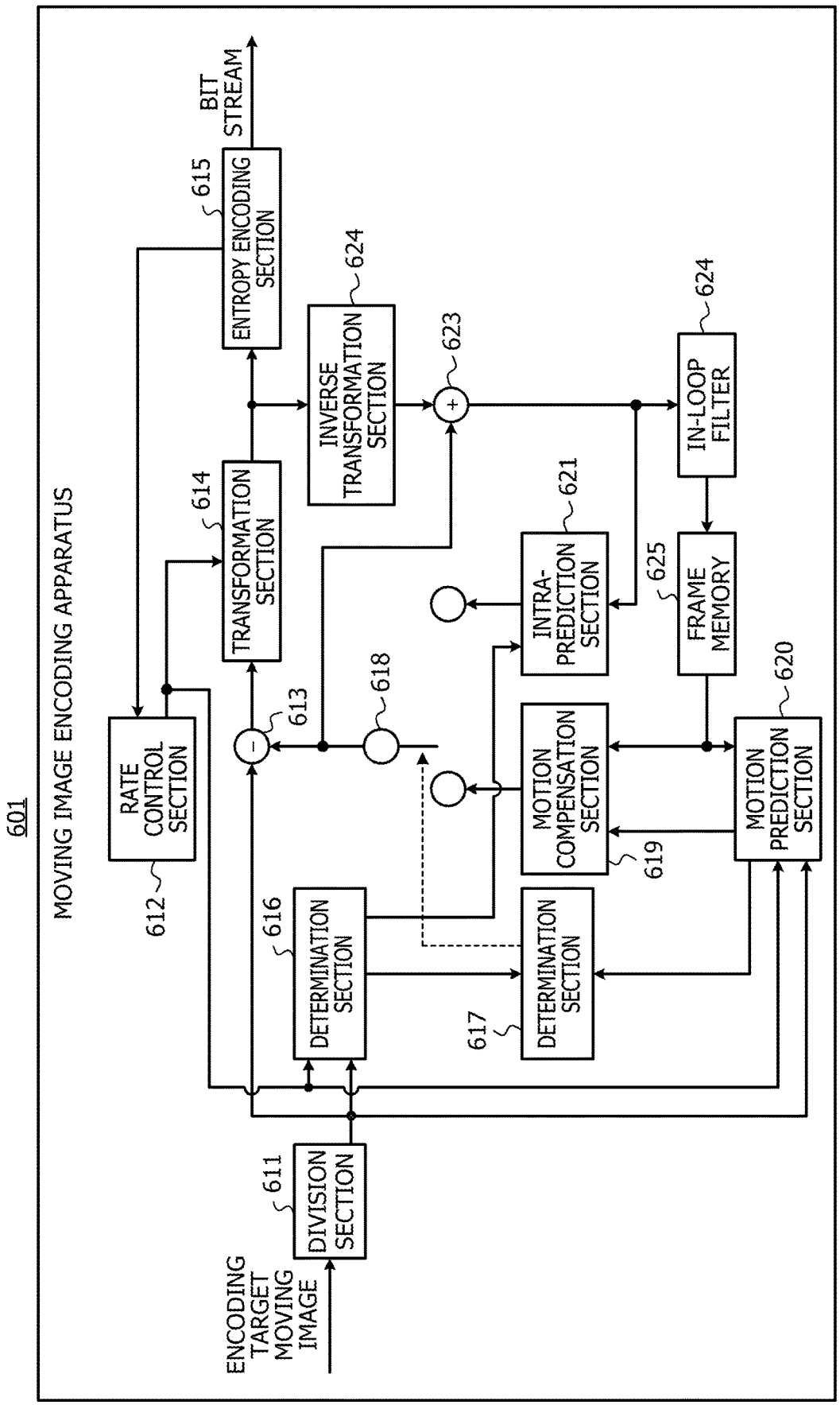
FIG. 6 is a view illustrating a functional configuration of an exemplary moving image encoding apparatus.

FIG. 6 illustrates a specific example of the moving image encoding apparatus 401 in FIG. 4. A moving image encoding apparatus 601 in FIG. 6 includes a division section 611, a rate control section 612, a difference generation section 613, a transformation section 614, an entropy encoding section 615, a determination section 616, a determination section 617, a switch 618, a motion compensation section 619, a motion prediction section 620, and an intra-prediction section 621. The moving image encoding apparatus 601 further includes an inverse transformation section 622, a reconfiguration section 623, an in-loop filter 624, and a frame memory 625.

The determination section 616 corresponds to the selection section 411 and the determination section 412 in FIG. 4, the intra-prediction section 621 corresponds to the intra-prediction section 413, the difference generation section 613, the transformation section 614, the entropy encoding section 615, and the switch 618 correspond to the encoding section 414.

For example, the moving image encoding apparatus 601 may be implemented as a hardware circuit. In this case, the constituents of the moving image encoding apparatus 601 may be implemented as individual circuits or one integrated circuit.

The moving image encoding apparatus 601 encodes an input encoding target moving image, and outputs an encoded moving image as a bit stream. The encoding target moving image includes a plurality of time series pictures. Each of the pictures corresponds to the encoding target image, and may be also referred to as a frame. Each of the pictures may be a color image or a monochrome image. When the picture is the color image, a pixel value may be represented in an RGB format or a YUV format.

The division section 611 determines the position of an encoding target CTU, which is the encoding target area in each picture, and divides the picture according to the block size of the CTU (CTU size), to extract an original image (CTU original image) of the encoding target CTU. Then, the division section 611 outputs the extracted CTU original image and the CTU size to the difference generation section 613, the determination section 616, and the motion prediction section 620.

Using the CTU original image and the CTU size that are output from the division section 611 and the quantization parameter QP output from the rate control section 612, the determination section 616 determines the block size of each PU in the CTU. Then, the determination section 616 determines the optimum intra-prediction mode for each PU and the block size of the TU, outputs the determined intra-prediction mode to the intra-prediction section 621, and outputs the encoding cost corresponding to the intra-prediction modes to the determination section 617.

The intra-prediction section 621 uses a reconfigured image output from the reconfiguration section 623 as peripheral pixels of the PU, and generates an intra-predicted image according to the intra-prediction mode output from the determination section 616. Then, the intra-prediction section 621 outputs the generated intra-predicted image to the switch 618.

Using a decoded image stored in the frame memory 625, the CTU original image output from the division section 611, and the quantization parameter QP output from the rate control section 612, the motion prediction section 620 determines the block size of each PU in the CTU. Next, the motion prediction section 620 determines an optimum motion vector for each PU, a reference index for the optimum decoded image, and the block size of the TU. Then, the motion prediction section 620 outputs the determined motion vector and reference index to the motion compensation section 619, and outputs the encoding cost corresponding to the motion vector and the reference index to the determination section 617.

The motion compensation section 619 acquires a decoded image indicated by the reference index output from the motion prediction section 620, from the frame memory 625, and uses the acquired decoded image and the motion vector output from the motion prediction section 620 to generate an inter-predicted image. Then, the motion compensation section 619 outputs the generated inter-predicted image to the switch 618.

The determination section 617 compares the encoding cost of each PU in the intra-prediction mode output from the determination section 616 with the encoding cost of each PU in the inter-prediction mode output from the motion prediction section 620. Then, the determination section 617 determines which of the intra-prediction modes and the inter-prediction modes is applied to each PU, and outputs a control signal indicating the determined prediction mode to the switch 618.

When the PU in the intra-prediction mode and the PU in the inter-prediction modes have different block sizes, the determination section 617 sums the encoding cost of the smaller PU according to the block size of the larger PU. Then, the determination section 617 compares the summed encoding cost with the encoding cost of the larger PU.

The entropy encoding section 615 encodes the transformation coefficient output from the transformation section 614 and each syntax of the encoding processing by the entropy encoding, and outputs the bit stream of the encoded moving image. Then, the entropy encoding section 615 outputs the bit amount (generated information amount) generated by the entropy encoding to the rate control section 612.

The rate control section 612 designates the quantization parameter QP such that the generated information amount output from the entropy encoding section 615 becomes a target information amount, and outputs the designated quantization parameter QP to the transformation section 614, the determination section 616, and the motion prediction section 620. The rate control section 612 may designate the quantization parameter QP in units of CU.

The switch 618 selects the intra-predicted image output from the intra-prediction section 621 or the inter-predicted image output from the motion prediction section 620 according to the control signal output from the determination section 617, and outputs the selected predicted image to the difference generation section 613.

The difference generation section 613 outputs a difference between the predicted image output from the switch 618 and a partial image included in the CTU original image output from the division section 611, as a prediction error, to the transformation section 614. The transformation section 614 applies the orthogonal transformation and the quantization to the difference output from the difference generation section 613, and outputs a quantization coefficient to the entropy encoding section 615 and the inverse transformation section 622.

The inverse transformation section 622 applies inverse quantization and inverse orthogonal transformation to the quantization coefficient output from the transformation section 614 to generate an inverse transformation difference, and outputs the generated inverse transformation difference to the reconfiguration section 623. The reconfiguration section 623 adds the predicted image output from the switch 618 to the inverse transformation difference output from the inverse transformation section 622 to generate a reconfigured image, and outputs the generated reconfigured image to the in-loop filter 624.

The in-loop filter 624 filters the reconfigured image output from the reconfiguration section 623 to generate a decoded image, and outputs the generated decoded image to the frame memory 625. The frame memory 625 stores the decoded image output from the in-loop filter 624.

The moving image encoding apparatus 601 may transmit the bit stream to a moving image decoding apparatus not illustrated via a communication network. In this case, the moving image decoding apparatus decodes the bit stream, and reconstructs the encoding target moving image.

The moving image encoding apparatus 601 is used for various kinds of applications. For example, the moving image encoding apparatus 601 may be incorporated into a video camera, a video transmitter, a video receiver, a television telephone system, a computer, or a mobile phone.

Figure 7:
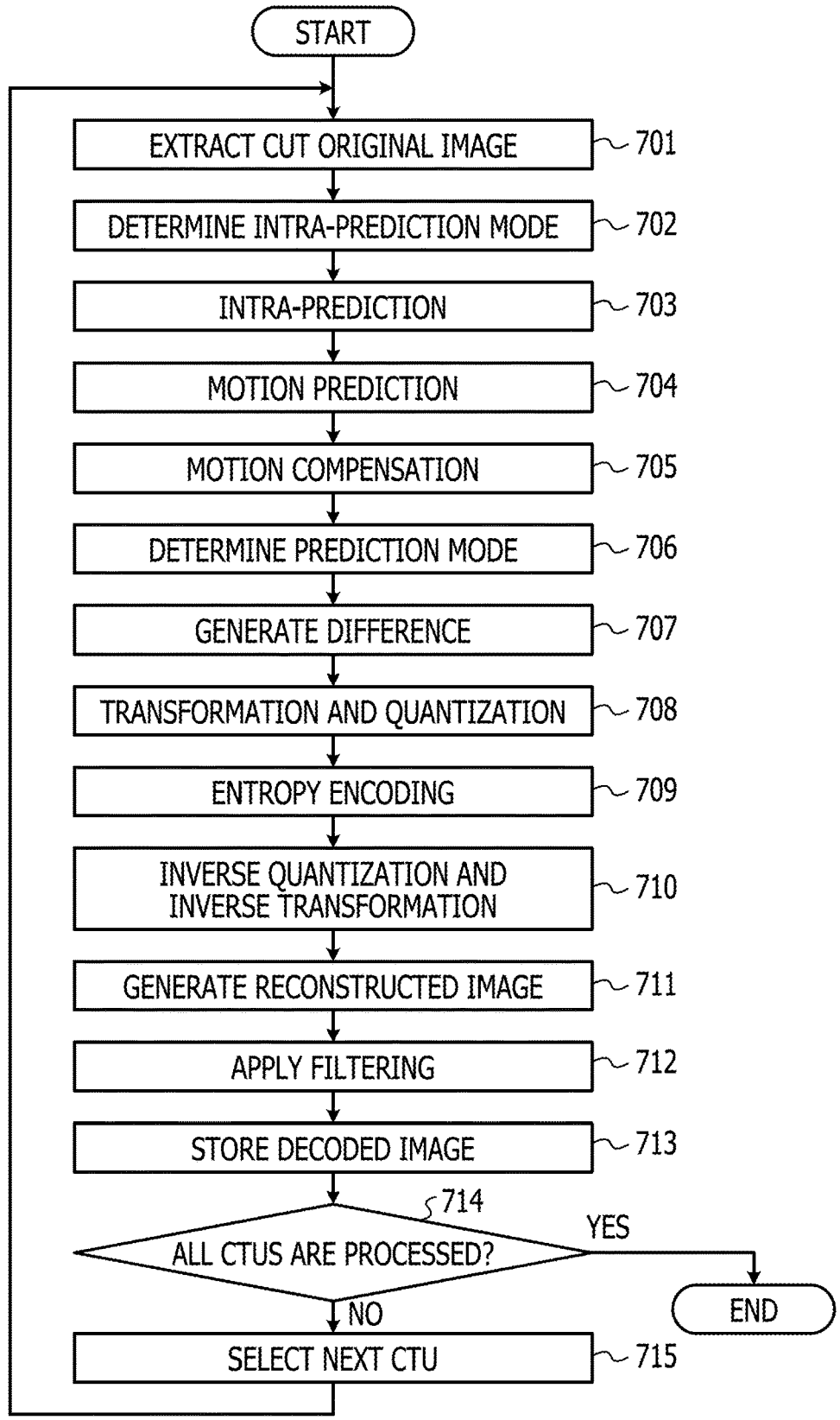
FIG. 7 is a flow chart of a specific example of moving image encoding processing.

FIG. 7 is a flow chart of a specific example of the moving image encoding processing performed by the moving image encoding apparatus 601 in FIG. 6. The moving image encoding processing in FIG. 7 is applied to each picture included in the encoding target moving image.

First, the division section 611 extracts one CTU original image from a picture (Step 701), and the determination section 616 determines the intra-prediction mode to determine the block size of each PU in the CTU and determine the intra-prediction modes for each PU (Step 702).

Next, the intra-prediction section 621 performs intra-prediction and generates an intra-predicted image (Step 703). The motion prediction section 620 performs the motion prediction and determines the motion vector for each PU and the reference index of the decoded image (Step 704), and the motion compensation section 619 performs the motion compensation to generate an inter-predicted image (Step 705).

Next, the determination section 617 determines which of the intra-prediction mode and the inter-prediction mode is applied to each PU (Step 706), and the difference generation section 613 generates a difference between the predicted image and the original image (Step 707). Then, the transformation section 614 applies the orthogonal transformation and the quantization to the difference (Step 708), and the entropy encoding section 615 applies the entropy encoding to the quantization coefficient (Step 709).

Next, the inverse transformation section 622 applies the inverse quantization and the inverse orthogonal transformation to the quantization coefficient (Step 710), and the reconfiguration section 623 generates a reconfigured image from the predicted image and the inverse transformation difference (Step 711). Then, the in-loop filter 624 filters the reconfigured image to generate a decoded image (Step 712), and stores the generated decoded image in the frame memory 625 (Step 713).

Next, the division section 611 checks whether or not all CTUs in the picture are processed (Step 714). When any unprocessed CTU remains (Step 714, NO), the division section 611 selects a next CTU (Step 715), and repeats the processing in Step 701 and subsequent steps. Then, when all CTUs are processed (Step 714, YES), the moving image encoding apparatus 601 terminates the processing.

Figure 8:
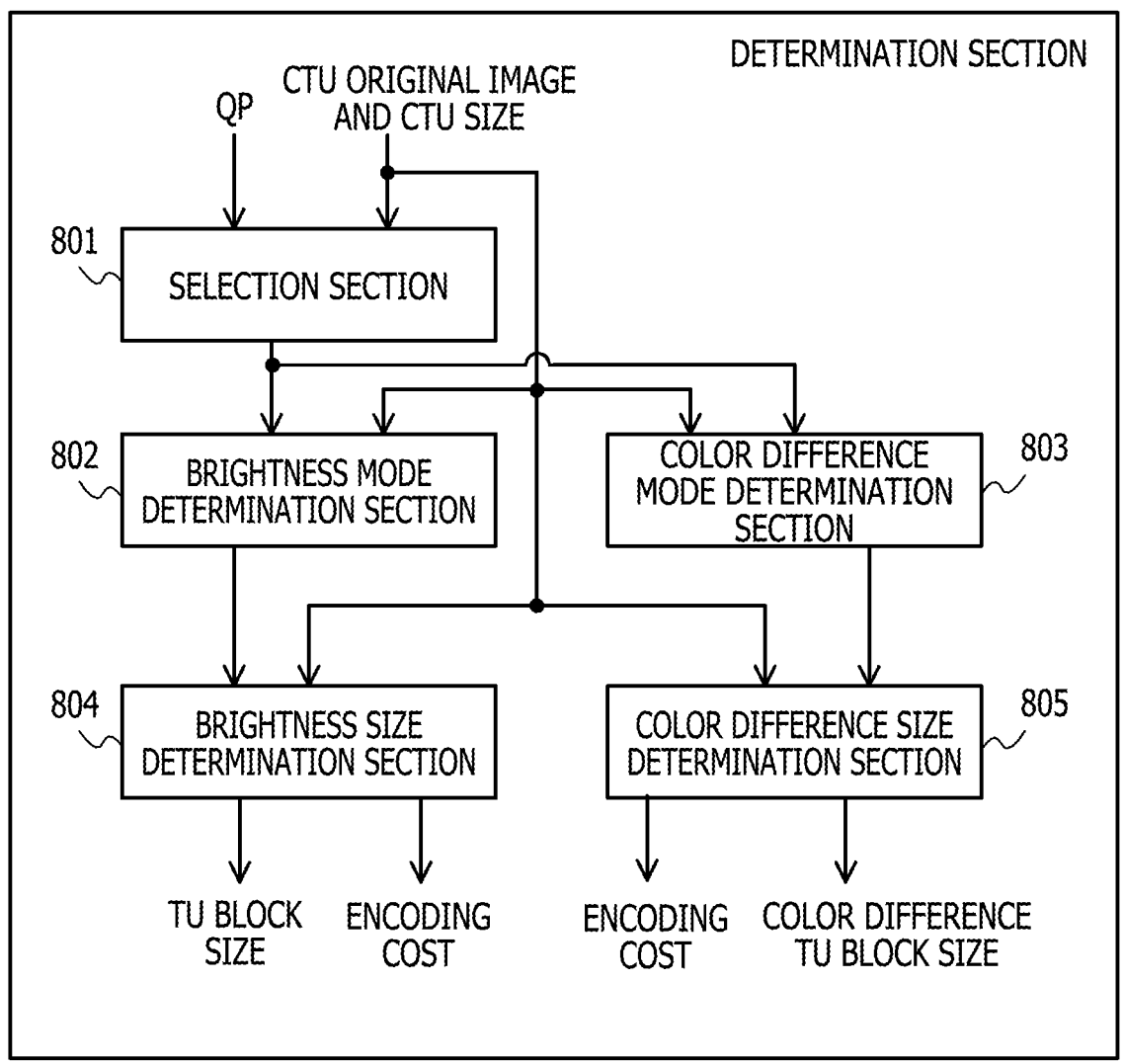
FIG. 8 is a view illustration a functional configuration of a determination section.

FIG. 8 illustrates an exemplary functional configuration of the determination section 616 in FIG. 6. The determination section 616 in FIG. 8 includes a selection section 801, a brightness mode determination section 802, a color-difference mode determination section 803, a brightness size determination section 804, and a color-difference size determination section 805. The selection section 801 corresponds to the selection section 411 in FIG. 4, and the brightness mode determination section 802 and the color-difference mode determination section 803 correspond to the determination section 412.

Using the CTU original image, the CTU size, and the quantization parameter QP, the selection section 801 recursively calculates the encoding cost of each of a plurality of PUs having different sizes, which are acquired by recursive division in each of a plurality of hierarchies of quadtree division.

In this case, the PU in each hierarchy is a processing target block, and the selection section 801 calculates the encoding cost based on a difference between the original image of each PU and an intra-predicted image in a direct current (DC) prediction mode. The pixel value of the intra-predicted image in the DC prediction mode is an average value of pixel values of a plurality of pixels included in a predetermined area adjacent to the PU on upper and left sides. For example, the RD cost C in Equation (1) is used as the encoding cost, and the SATD is used as a difference D in Equation (1).

Next, the selection section 801 compares the encoding costs of the plurality of PUs with each other to determine the optimum block size of the PU, and outputs the determined block size to the brightness mode determination section 802 and the color-difference mode determination section 803. In this case, the PU having the minimum encoding cost is determined as an optimum PU.

Using the CTU original image, the CTU size, the quantization parameter QP, and the determined block size of the PU, the brightness mode determination section 802 calculates the encoding cost for each of 35 types of intra-prediction modes. The 35 types of intra-prediction modes include the DC prediction mode, a Planar prediction mode, and 33-direction Angular prediction mode.

Next, the brightness mode determination section 802 compares the encoding costs in the 35 types of intra-prediction modes with each other to determine the optimum intra-prediction mode of the PU, and outputs the determined intra-prediction mode to the brightness size determination section 804. In this case, the intra-prediction mode having the minimum encoding cost is determined as the optimum intra-prediction mode.

Using the CTU original image, the CTU size, and the determined intra-prediction mode, the brightness size determination section 804 determines the block size of the TU to the PU, and outputs the block size of the TU and the encoding cost in the determined intra-prediction mode.

Using the CTU original image, the CTU size, the quantization parameter QP, and the determined block size of the PU, the color-difference mode determination section 803 calculates the encoding cost in each of five types of color-difference intra-prediction modes for the color-difference PU. The five types of color-difference intra-prediction modes include the DC prediction mode, the Planar prediction mode, a vertical prediction mode, a horizontal prediction mode, and a diagonal prediction mode.

Next, the color-difference mode determination section 803 compares the encoding costs of the five types of color-difference intra-prediction modes with each other to determine an optimum color-difference intra-prediction mode, and outputs the determined color-difference intra-prediction modes to the color-difference size determination section 805. In this case, the color-difference intra-prediction mode having the minimum encoding cost is determined as the optimum color-difference intra-prediction mode.

Using the CTU original image, the CTU size, and the determined color-difference intra-prediction mode, the color-difference size determination section 805 determines the block size of the color-difference TU for the color-difference PU, and outputs the block size of the color-difference TU, and the encoding cost in the determined color-difference intra-prediction mode.

Figure 9:
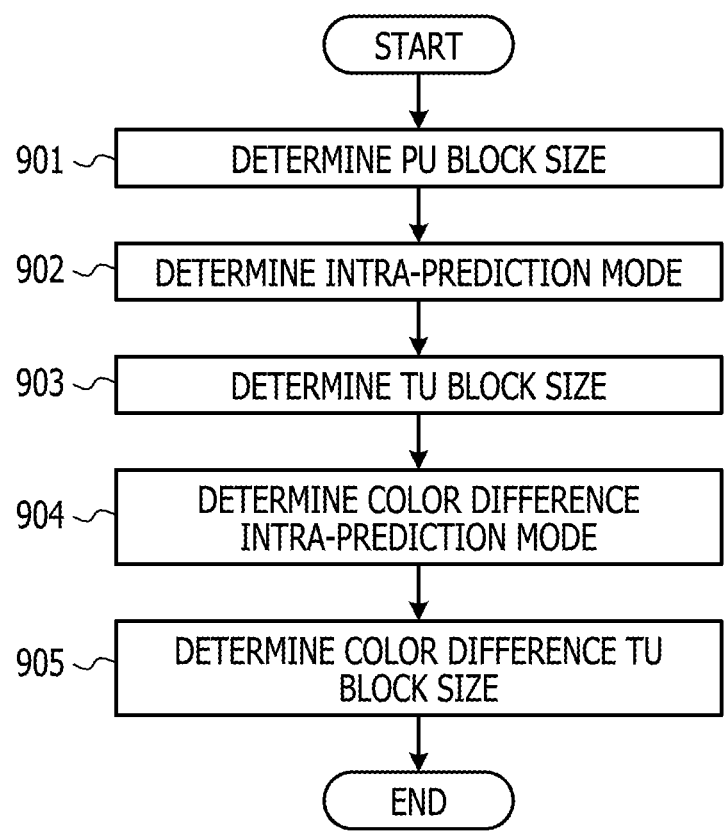
FIG. 9 is a flow chart of intra-prediction mode determination processing.

FIG. 9 is a flow chart of exemplary intra-prediction mode determination processing executed by the determination section 616 in FIG. 8. First, the selection section 801 determines the optimum block size of the PU from the block sizes in the plurality of hierarchies of quadtree division (Step 901).

Next, the brightness mode determination section 802 determines the optimum intra-prediction mode for the PU (Step 902), and the brightness size determination section 804 determines the block size of the TU for the PU (Step 903).

Next, the color-difference mode determination section 803 determines the optimum color-difference intra-prediction mode for the color-difference PU (Step 904), and the color-difference size determination section 805 determines the block size of the color-difference TU for the color-difference PU (Step 905).

The selection section 801 of the determination section 616 in FIG. 8 does not calculate the encoding costs in 35 types of intra-prediction modes in a plurality of hierarchies, but calculates the encoding costs only in the DC prediction mode. The brightness mode determination section 802 does not calculate the encoding costs in the 35 types of intra-prediction modes in the plurality of hierarchies, but calculates the encoding costs in the 35 types of intra-prediction modes in one hierarchy determined by the selection section 801.

Accordingly, as compared to the case of calculating the encoding costs in 35 types of intra-prediction modes in the plurality of hierarchies, the number of times of calculations of the encoding cost with a large computation amount is reduced to shorten the processing time for determining the optimum hierarchy and intra-prediction mode.

In calculating the encoding cost in the DC prediction mode in each of the plurality of hierarchies, the selection section 801 may use a pseudo DC predicted image that approximates the DC predicted image to simplify the processing. In this case, the selection section 801 uses a pixel value of the pre-coded original image in place of the reconfigured image as a pixel value of the peripheral area adjacent to the processing target block in the DC prediction mode to generate the pseudo DC predicted image. Whereby, the predicted image may be generated before establishing the reconfigured image of peripheral blocks, simplifying the processing.

Using the encoding cost including SATD, the selection section 801 utilizes cumulation of the Hadamard transformation to recursively calculate the encoding cost for the PU in each of the plurality of hierarchies. A transformation matrix $H_m$ (m is an integer of 1 or more) of the Hadamard transformation is a matrix of $2^m \times 2^m$, and is recursively defined according to a following equation.

$$H_m = \frac{1}{\sqrt{2}} \begin{pmatrix} H_{m-1} & H_{m-1} \\ H_{m-1} & -H_{m-1} \end{pmatrix} \quad (11)$$

However, a transformation matrix $H_0$ of 1×1 is defined by $H_0=1$. When a normalization coefficient included in $H_m$ in Equation (11) is omitted, the Hadamard transformation may be described as a transformation matrix $T_m$ according to a following equation.

$$T_m = \begin{pmatrix} T_{m-1} & T_{m-1} \\ T_{m-1} & -T_{m-1} \end{pmatrix} \quad (12)$$

Wherein, $T_0=H_0=1$. For example, in the case of m=2, according to Equation (12), a transformation matrix $T_2$ of 4×4 is described as a following equation.

$$T_2 = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (13)$$

A transformation result T(M) acquired by transforming a $2^m \times 2^m$ matrix M using a transformation matrix $T=T_m$ is described according to a following equation.

$$T(M) = TMT^T \quad (14)$$

$T^T$ in Equation (14) denotes a transposed matrix acquired by transposing a transformation matrix T. In a $2^m \times 2^m$ block, given that a horizontal coordinate is X coordinate, and a vertical coordinate is y coordinate, a matrix M representing an image of the block is generated by using the pixel value of the pixel corresponding to coordinates (x, y) as an element M[x][y] of the matrix M. In this case, the X coordinate indicates a row of the matrix M, and the y coordinate indicates a column of the matrix M.

For example, in the case of m=2, according to Equation (13) and Equation (14), a transformation result T(M) of a 4×4 matrix M is described as a following equation.

$$T(M) = T_2 M T_2^T = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (15)$$

$$\begin{pmatrix} M[0][0] & M[1][0] & M[2][0] & M[3][0] \\ M[0][1] & M[1][1] & M[2][1] & M[3][1] \\ M[0][2] & M[1][2] & M[2][2] & M[3][2] \\ M[0][3] & M[1][3] & M[2][3] & M[3][3] \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

$$M = \begin{pmatrix} M[0][0] & M[1][0] & M[2][0] & M[3][0] \\ M[0][1] & M[1][1] & M[2][1] & M[3][1] \\ M[0][2] & M[1][2] & M[2][2] & M[3][2] \\ M[0][3] & M[1][3] & M[2][3] & M[3][3] \end{pmatrix} \quad (16)$$

The SATD in the DC prediction mode is a sum of absolute values of a transformation result acquired by transforming a difference between the original image and the DC predicted image of the processing target block by the Hadamard transformation. The SATD in the DC prediction mode of the n×n (n=$2^m$) block is described using an n×n matrix M having the pixel value as an element of the original image and an n×n matrix P having the pixel value as an element of the DC predicted image according to a following equation.

$$S=\Sigma(x=0 \text{ to } n-1, y=0 \text{ to } n-1)|T(M-P)T^T[x][y]|=\Sigma \\ (x=0 \text{ to } n-1, y=0 \text{ to } n-1)|Q[x][y]| \qquad (17)$$

$$Q[x][y]=TMT^T[x][y]-TPT^T[x][y] \qquad (18)$$

In Equation (17), S denotes the SATD in the DC prediction mode. $\Sigma(x=0 \text{ to } n-1, y=0 \text{ to } n-1)$ denotes a sum of all elements in the range of X=0 to n−1 and y=0 to n−1.

An element P[x][y] of the matrix P is an average value of pixel values of a plurality of pixels included in a predetermined area adjacent to a block corresponding to the matrix P on upper and left sides. Since P[x][y] is uniform, in the case of $TMT^T[0][0] \geq (n \times n)P[0][0]$, Equation (17) may be modified as a following equation.

$$S=\Sigma(x=0 \text{ to } n-1, y=0 \text{ to } n-1)|TMT^T[x][y]|-(n \times n)P[0][0] \qquad (19)$$

Meanwhile, in the case of $TMT^T[0][0] < (n \times n)P[0][0]$, Equation (17) may be modified as a following equation.

$$S=\Sigma(x=0 \text{ to } n-1, y=0 \text{ to } n-1)|TMT^T[x][y]|+(n \times n)P[0][0]-2TMT^T[0][0] \qquad (20)$$

Here, a method of deriving Equation (19) and Equation (20) will be described. For example, in the case of n=4 (m=2), Q[x][y] in Equation (18) is described in a following equation.

$$Q[x][y]=T_2MT_2^T[x][y]-T_2PT_2^T[x][y] \qquad (21)$$

$T_2MT_2^T[x][y]$ in Equation (21) is found from Equation (15). Because of P[x][y]=P[0][0], $T_2PT_2^T[x][y]$ may be modified as a following equation.

$$T_2PT_2^T = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} P[0][0] & P[0][0] & P[0][0] & P[0][0] \\ P[0][0] & P[0][0] & P[0][0] & P[0][0] \\ P[0][0] & P[0][0] & P[0][0] & P[0][0] \\ P[0][0] & P[0][0] & P[0][0] & P[0][0] \end{pmatrix} \qquad (22)$$

$$\begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

$$= P[0][0] \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} 1 & 1 & 1 & 1 \\ 1 & 1 & 1 & 1 \\ 1 & 1 & 1 & 1 \\ 1 & 1 & 1 & 1 \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

$$= (4 \times 4)P[0][0] \begin{pmatrix} 1 & 0 & 0 & 0 \\ 0 & 0 & 0 & 0 \\ 0 & 0 & 0 & 0 \\ 0 & 0 & 0 & 0 \end{pmatrix}$$

According to Equation (22), Q[x][y] in Equation (21) may be modified as a following equation.

$$Q = T_2MT_2^T - (4 \times 4)P[0][0] \begin{pmatrix} 1 & 0 & 0 & 0 \\ 0 & 0 & 0 & 0 \\ 0 & 0 & 0 & 0 \\ 0 & 0 & 0 & 0 \end{pmatrix} \qquad (23)$$

According to Equation (23), in the case of $T_2MT_2^T[0][0] \geq (4 \times 4)P[0][0]$, Equation (17) may be modified as a following equation.

$$S=(T_2MT_2^T[0][0]-(4 \times 4)P[0][0])+\Sigma(x=0 \text{ to } n-1, y=0 \\ \text{to } n-1)|T_2MT_2^T[x][y]|-T_2MT_2^T[0][0]=\Sigma(x=0 \text{ to } \\ n-1, y=0 \text{ to } n-1)|T_2MT_2^T[x][y]|-(4 \times 4)P[0][0] \qquad (24)$$

Equation (24) matches Equation (19) in the case of n=4. Meanwhile, in the case of $T_2MT_2^T[0][0] < (4 \times 4)P[0][0]$, Equation (17) may be modified as a following equation.

$$S=-(T_2MT_2^T[0][0]-(4 \times 4)P[0][0])+\Sigma(x=0 \text{ to } n-1, y=0 \\ \text{to } n-1)|T_2MT_2^T[x][y]|-T_2MT_2^T[0][0]=\Sigma \\ (x=0 \text{ to } n-1, y=0 \text{ to } n-1)|T_2MT_2^T[x][y]|+(4 \times 4)P \\ [0][0]-2T_2MT_2^T[0][0] \qquad (25)$$

Equation (25) matches Equation (20) in the case of n=4. Further, as in the case of n>4 (m>2), Equation (19) and Equation (20) may be derived from Equation (17).

$TMT^T[x][y]$ in Equation (19) and Equation (20) and $TMT^T[0][0]$ in Equation (20) may be recursively calculated from a transformation result acquired by transforming submatrices M[0] to M[3] of M using the transformation matrix $T_{m-1}$ according to a following equation.

$$TMT^T = T_m M T_m^T \qquad (26)$$
$$= \begin{pmatrix} T_{m-1} & T_{m-1} \\ T_{m-1} & -T_{m-1} \end{pmatrix} \begin{pmatrix} M[0] & M[1] \\ M[2] & M[3] \end{pmatrix} \begin{pmatrix} T_{m-1} & T_{m-1} \\ T_{m-1} & -T_{m-1} \end{pmatrix}^T$$
$$= \begin{pmatrix} T_{m-1} & T_{m-1} \\ T_{m-1} & -T_{m-1} \end{pmatrix} \begin{pmatrix} M[0] & M[1] \\ M[2] & M[3] \end{pmatrix} \begin{pmatrix} T_{m-1}^T & T_{m-1}^T \\ T_{m-1}^T & -T_{m-1}^T \end{pmatrix}$$
$$= \begin{pmatrix} H[0] & H[1] \\ H[2] & H[3] \end{pmatrix}$$

$$M = \begin{pmatrix} M[0] & M[1] \\ M[2] & M[3] \end{pmatrix} \qquad (27)$$

$$H[0] = \qquad (28)$$
$$T_{m-1}M[0]T_{m-1}^T + T_{m-1}M[2]T_{m-1}^T + T_{m-1}M[1]T_{m-1}^T + T_{m-1}M[3]T_{m-1}^T$$

$$H[1] = \qquad (29)$$
$$T_{m-1}M[0]T_{m-1}^T + T_{m-1}M[2]T_{m-1}^T - T_{m-1}M[1]T_{m-1}^T - T_{m-1}M[3]T_{m-1}^T$$

$$H[2] = \qquad (30)$$
$$T_{m-1}M[0]T_{m-1}^T - T_{m-1}M[2]T_{m-1}^T + T_{m-1}M[1]T_{m-1}^T - T_{m-1}M[3]T_{m-1}^T$$

$$H[3] = \qquad (31)$$
$$T_{m-1}M[0]T_{m-1}^T - T_{m-1}M[2]T_{m-1}^T - T_{m-1}M[1]T_{m-1}^T + T_{m-1}M[3]T_{m-1}^T$$

P[0][0] in Equation (19) and Equation (20) may be recursively calculated from pixel values of a plurality of pixels included in a predetermined area adjacent to a sub block corresponding to a submatrix of P on upper and left sides.

Thus, using a transformation result for the original image of the PU having a smaller block size than the processing target PU by the Hadamard transformation, the selection section 801 calculates a transformation result of the original image of the processing target PU by the Hadamard transformation. Using pixel values of a plurality of pixels included in a predetermined area adjacent to the PU having a smaller block size than the processing target PU on upper and left sides, the selection section 801 calculates P[0][0] for the processing target PU.

Next, the transformation result of the original image of the processing target PU by the Hadamard transformation, and P[0][0] for the processing target PU, the selection section 801 calculates the SATD according to Equation (19) or Equation (20). Then, using the calculated SATD, the selection section 801 calculates the encoding cost of the processing target PU.

Accordingly, if the Hadamard transformation is applied to only the smallest block, a transformation result for a larger block by the Hadamard transformation may be recursively found from a transformation result for a smaller block. At this time, recursive calculation of the original image by the Hadamard transformation and recursive calculation of P[0][0] may be individually performed.

For example, in the case where the RD cost is used as the encoding cost including the SATD, according to Equation (1), the RD cost C may be calculated by a following equation.

$$C = S + \lambda \times R + V \quad (32)$$

A transformation coefficient $\lambda$ in Equation (32) denotes the ratio of a bit amount R to the cost S(SATD) included in the RD cost C, and is determined based on the quantization parameter QP. The bit amount R is the bit amount generated when the syntax used in the intra-prediction encoding is encoded. The syntaxes used in the intra-prediction encoding are as follows.

Coding quadtree syntax:
split_cu_flagCoding unit syntax:
cu_transquant_bypass_flag
part_mode
prev_intra_luma_pred_flag
mpm_idx
rem_intra_luma_pred_mode
intra_chroma_pred_mode Among them, on split_cu_flag and part_mode, the bit amount is determined from a CU Depth of the processing target PU and a largest CU Depth. On the other syntaxes, the bit amount may be determined from a statistic value of the encoding target moving image, or the bit amount may be determined from a statistic value previously acquired in a typical dynamic area. In the case where the bit amount of the syntax is limited by implementation conditions, a designated bit amount may be used. In the case where an algebraic sign is used in entropy encoding, the bit amount of the syntax may be determined by statistics or estimation.

V in Equation (32) denotes an offset value. A difference between the RD cost calculated from the predicted image generated using the reconfigured image and the RD cost calculated from the predicted image generated using the pre-coded original image may be corrected by adding the offset value V to the RD cost C. A statistic value acquired by simulation using a sample dynamic area may be used as the offset value V.

Figure 10:
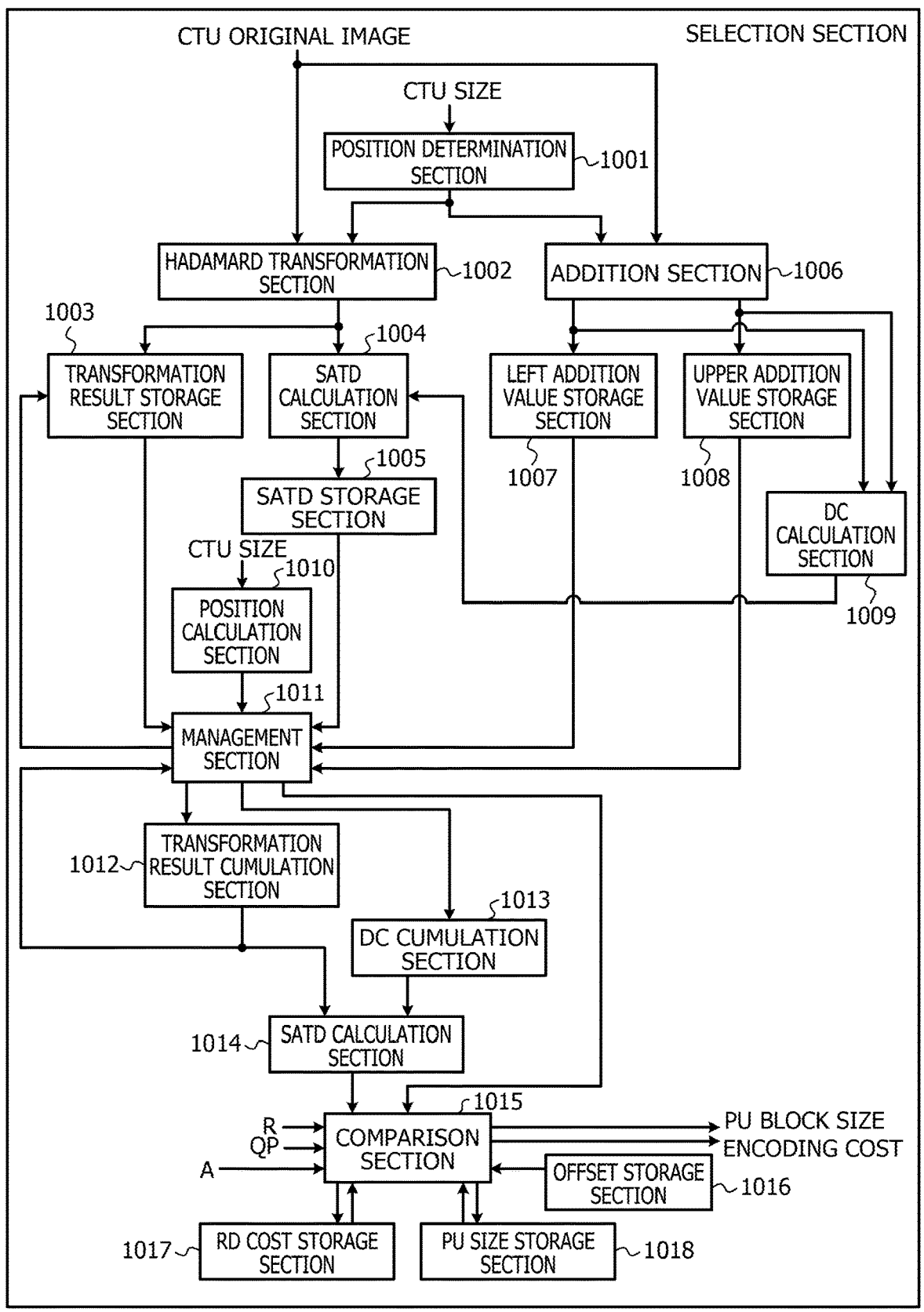
FIG. 10 is a view illustration a functional configuration of a selection section.

FIG. 10 illustrates an exemplary functional configuration of the selection section 801 in FIG. 8. The selection section 801 in FIG. 10 includes a position determination section 1001, an Hadamard transformation section 1002, a transformation result storage section 1003, an SATD calculation section 1004, an SATD storage section 1005, an addition section 1006, a left addition value storage section 1007, and an upper addition value storage section 1008.

The selection section 801 further includes a DC calculation section 1009, a position calculation section 1010, a management section 1011, a transformation result cumulation section 1012, a DC cumulation section 1013, an SATD calculation section 1014, and a comparison section 1015. The selection section 801 further includes an offset storage section 1016, an RD cost storage section 1017, and a PU size storage section 1018.

The position determination section 1001 determines a position (bx, by) of the 4×4 block that is the smallest PU in the CTU based on the CTU size, and outputs the position (bx, by) to the Hadamard transformation section 1002 and the addition section 1006.

Figure 11:
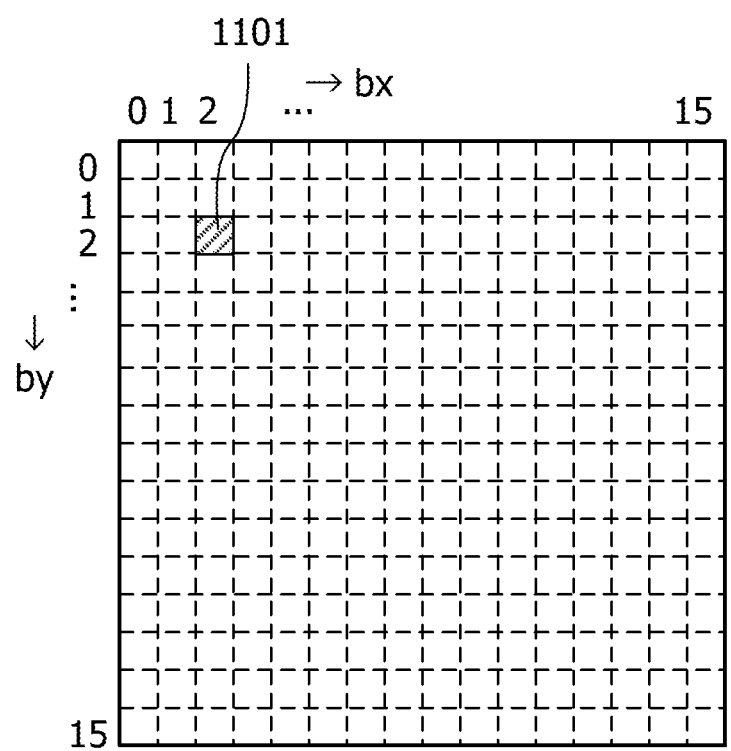
FIG. 11 is a view illustrating 4×4 blocks.

FIG. 11 illustrates an example of the position (bx, by) of the 4×4 block in the CTU. The CTU size of the CTU in FIG. 11 is 64×64, and the number of 4×4 blocks in the CTU is 16×16. Accordingly, the position of each block is described using (bx, by) in the range of bx=0 to 15 and by=0 to 15. For example, the position of a block 1101 is (bx, by)=(2, 2).

Using the pixel value of the 4×4 block corresponding to the position (bx, by) in the CTU original image, the Hadamard transformation section 1002 calculates an Hadamard transformation result H(bx, by) according to Equation (15). Then, the Hadamard transformation section 1002 outputs the H(bx, by) to the transformation result storage section 1003 and the SATD calculation section 1004. The transformation result storage section 1003 stores the Hadamard transformation result H(bx, by) in association with the position (bx, by).

Using pixel values of the peripheral area (upper peripheral area) adjacent to the 4×4 block on the upper side, which corresponds to the position (bx, by) in the CTU original image, the addition section 1006 calculates an upper additional value U(bx, by), and outputs the upper additional value U(bx, by) to the upper addition value storage section 1008. Using pixel values of the peripheral area (left peripheral area) adjacent to the 4×4 block on the left side, the addition section 1006 calculates a left additional value L(bx, by), and outputs the left additional value L(bx, by) to the left addition value storage section 1007.

Figure 12:
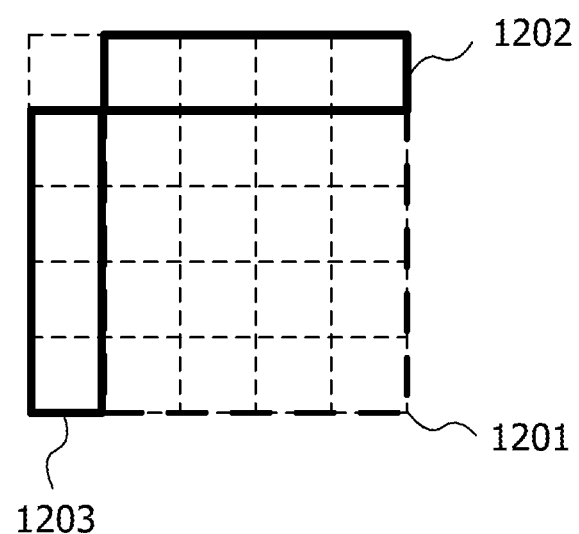
FIG. 12 is a view illustrating an upper peripheral area and a left peripheral area.

FIG. 12 illustrates an example of the upper peripheral area and the left peripheral area of the 4×4 block. The upper additional value U(bx, by) is a sum of pixel values of four pixelsincluded in an upper peripheral area 1202 of a 4×4 block 1201, and the left additional value L(bx, by) is a sum of pixel values of four pixels included in a left peripheral area 1203 of a 4×4 block 1201.

The upper addition value storage section 1008 stores the upper additional value U(bx, by) in association with the position (bx, by), and the left addition value storage section 1007 stores the left additional value L(bx, by) in association with the position (bx, by).

The DC calculation section 1009 calculates a pixel value DC(bx, by) of the pseudo DC predicted image of the 4×4 block corresponding to the position (bx, by) according to a following equation, and outputs the DC(bx, by) to the SATD calculation section 1004.

$$DC(bx,by) = (U(bx,by) + L(bx,by))/8 \quad (41)$$

The DC(bx, by) in Equation (41) denotes an average value of pixel values of eight pixels included in the left peripheral area and the upper peripheral area, and corresponds to P[0][0] in Equation (19) and Equation (20). When the pixel values in the left peripheral area and the upper peripheral area of the 4×4 block may not be referred to, the DC calculation section 1009 outputs 128 as DC(bx, by).

The SATD calculation section 1004 calculates S(bx, by) that is the SATD of the 4×4 block corresponding to the position (bx, by) from the Hadamard transformation result H(bx, by) and the pixel value DC(bx, by) according to Equation (19) or Equation (20). Then, the SATD calculation section 1004 outputs the S(bx, by) to the SATD storage section 1005, and the SATD storage section 1005 stores the S(bx, by) in association with the position (bx, by).

Using the block size of the processing target block as 2A×2A (A=4, 8, 16, 32), the position calculation section 1010 calculates the position (X, Y) of the processing target block, and outputs the parameter A indicating the block size and the position (X, Y) to the management section 1011.

Figure 13:
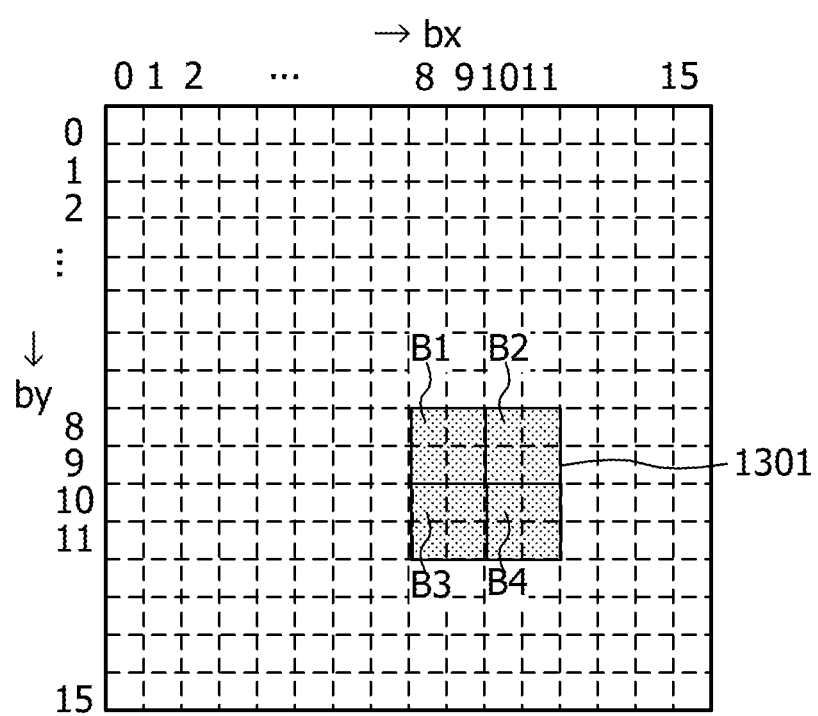
FIG. 13 is a view illustrating a processing target block.

FIG. 13 illustrates an example of the position (X, Y) of the processing target block in the CTU in FIG. 11. The position (X, Y) of the 2A×2A processing target block is expressed by the position (bx, by) of the A×A block located in the upper left corner of the processing target block. For example, in the case of A=4, four 4×4 blocks are present in the 8×8 processing target block, and the position (bx, by) located in the upper left corner is used as the position (X, Y) of the processing target block.

In the case of the 16×16 processing target block 1301 in FIG. 13, four 8×8 blocks are present in the processing target block 1301, and four 4×4 blocks are present in each of the four 8×8 blocks. A block B1 to a block B4 each are a 4×4 block located in the upper left corner in each of the four 8×8 blocks. In this case, the position (8, 8) of the block B1 located in the upper left corner, among the block B1 to block B4, is used as the position (X, Y) of the processing target block 1301.

The position calculation section 1010 sets an initial value of the position (X, Y) of the 2A×2A processing target block to (0, 0), and repeats the processing of moving the position (X, Y) by 2A/4 according to (X, Y)=(X+(2A/4), Y). Then, when a right end of the processing target block reaches a right end of the CTU, the position calculation section 1010 repeats the processing of moving the position (X, Y) to a left end by 2A/4 according to (X, Y)=(0, Y+(2A/4)). The position calculation section 1010 repeats the processing until a lower end of the processing target block reaches a lower end of the CTU and the right end of the processing target block reaches the right end of the CTU.

Further, the position calculation section 1010 updates the parameter A according to A=A*2, and repeats the same processing until 2A×2A reaches the CTU size or the designated largest block size of the PU.

Based on the position (X, Y) output from the position calculation section 1010, the management section 1011 reads data from the transformation result storage section 1003, the SATD storage section 1005, the left addition value storage section 1007, and the upper addition value storage section 1008.

H(X, Y), H(X+A/4, Y), H(X, Y+A/4), and H(X+A/4, Y+A/4), which are Hadamard transformation results of four A×A blocks in the processing target block represented by the position (X, Y), are read from the transformation result storage section 1003. For example, in the case of A=4, Hadamard transformation results H(X, Y), H(X+1, Y), H(X, Y+1), and H(X+1, Y+1) of the four 4×4 blocks in the processing target block are read. The management section 1011 outputs the read Hadamard transformation results of the four A×A blocks to the transformation result cumulation section 1012.

Using the Hadamard transformation results of the four A×A blocks, the transformation result cumulation section 1012 calculates the Hadamard transformation result H(X, Y) of the processing target block according to Equation (26) to Equation (31), and outputs the H(X, Y) to the management section 1011 and the SATD calculation section 1014. The management section 1011 outputs the Hadamard transformation result H(X, Y) to the transformation result storage section 1003, and the transformation result storage section 1003 stores the Hadamard transformation result H(X, Y) in association with in association with the position (X, Y).

For example, in the case of the 16×16 processing target block 1301 in FIG. 13, four 8×8 blocks are present in the processing target block 1301. The Hadamard transformation result of the 8×8 block located in the upper left corner in association with the position (8, 8) of the block B1 is stored, and the Hadamard transformation result of the 8×8 block located in the upper right corner in association with the position (10, 8) of the block B2.

The Hadamard transformation result of the 8×8 block located in the lower left corner is stored in association with the position (8, 10) of the block B3, and the Hadamard transformation result of the 8×8 block located in the lower right corner is stored in association with the position (10, 10) of the block B4.

Then, the four Hadamard transformation results stored in association with the positions of the block B1 to block B4 are read, and using the read Hadamard transformation results, the Hadamard transformation result of the processing target block 1301 are calculated. Then, the calculated Hadamard transformation result of the processing target block 1301 is stored in association with the position (8, 8) of the block B1.

When the 32×32 block including the processing target block 1301 is selected as a new processing target block, the Hadamard transformation result stored in association with the position of the block B1 is read as the Hadamard transformation result of the 16×16 block.

A storage area of the transformation result storage section 1003 is not necessarily a two-dimensional area such as the CTU in FIG. 13, and may be a one-dimensional continuous area associated with the position (bx, by).

k upper additional values U(X, Y) to U(X+k−1, Y) corresponding to the upper peripheral area of the processing target block represented by the position (X, Y) are read from the upper addition value storage section 1008. k left additional values L(X, Y) to L(X, Y+k−1) corresponding to the left peripheral area of the processing target block are read from the left addition value storage section 1007. The number k of the additional values read from the upper addition value storage section 1008 and the left addition value storage section 1007 are determined using a parameter A according to a following equation.

$$k=(1<<\log_2(2A))>>2 \quad (42)$$

"1<<$\log_2(2A)$" in Equation (42) denotes an operation of shifting "1" represented by a binary number to the left by $\log_2(2A)$ bits, and "(1<<$\log_2(2A)$)>>2" denotes an operation of shifting (1<<$\log_2(2A)$) to the right by 2 bits.

Figure 14:
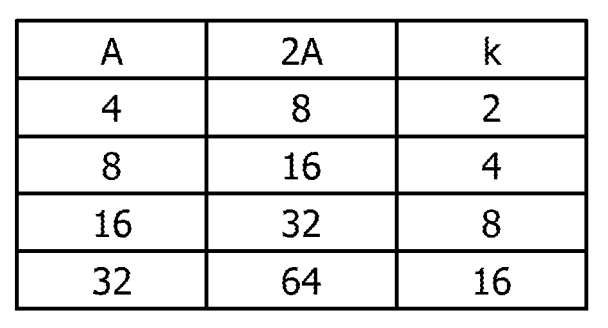

FIG. 14 illustrates an example of the number k of the read additional values. k=2, 4, 8, and 16 is set for A=4, 8, 16, 32, respectively.

For example, in the case of A=4, the upper additional values U(bx, by) of the two 4×4 blocks corresponding to the upper peripheral area (8 pixels) of the 8×8 processing target block are read. The left additional values L(bx, by) of the two 4×4 blocks corresponding to the left peripheral area (8 pixels) of the 8×8 processing target block are read.

In the case of A=8, the upper additional values U(bx, by) of the four 4×4 blocks corresponding to the upper peripheral area (16 pixels) of the 16×16 processing target block are read. The left additional values L(bx, by) of the four 4×4 blocks corresponding to the left peripheral area (16 pixels) of the 16×16 processing target block are read.

In the case of A=16, the upper additional values U(bx, by) of the eight 4×4 blocks corresponding to the upper peripheral area (32 pixels) of the 32×32 processing target block are read. The left additional values L(bx, by) of the eight 4×4 blocks corresponding to the left peripheral area (32 pixels) of the 32×32 processing target block are read.

In the case of A=32, the upper additional values U(bx, by) of the sixteen 4×4 blocks corresponding to the upper peripheral area (64 pixels) of the 64×64 processing target block are read. The left additional values L(bx, by) of the sixteen 4×4 blocks corresponding to the left peripheral area (64 pixels) of the 64×64 processing target block are read.

The upper additional values U and the left additional values L of the processing target block may be calculated by sequentially cumulating the upper additional values U and the left additional values L according to the block size indicated by the parameter A, in place of using the upper additional value U and the left additional value L for each 4×4 block. In this case, for example, the upper additional value U or the left additional value L of the 8×8 block is calculated from the upper additional value U or the left additional value L of the 4×4 block, and the upper additional value U or the left additional value L of the 16×16 block is calculated from the upper additional value U or the left additional value L of the 8×8 block.

Figure 15:
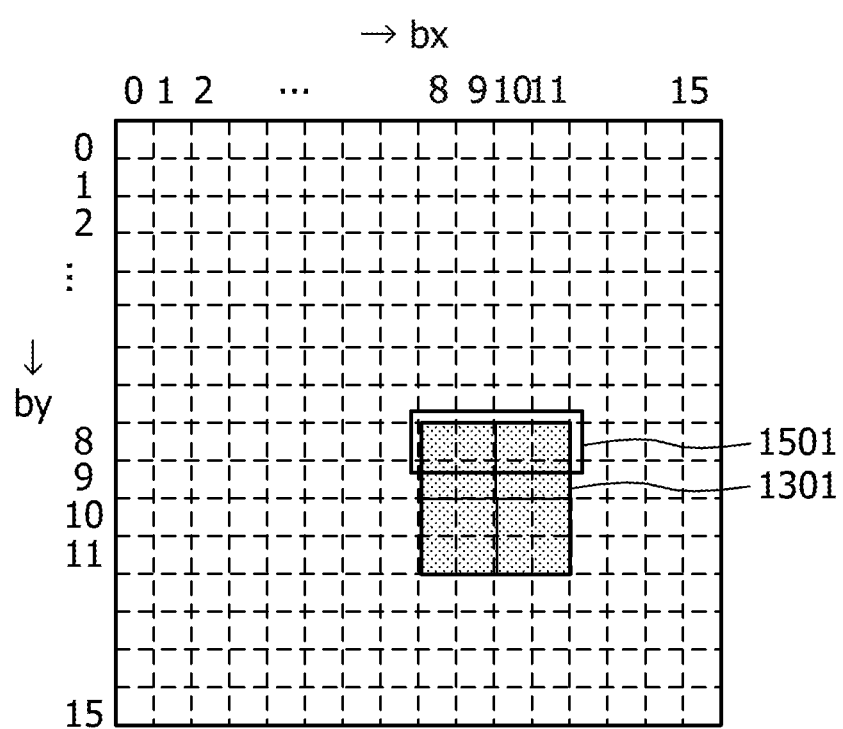
FIG. 15 is a view illustrating an upper additional value.

FIG. 15 illustrates an example of the upper additional value U(bx, by) read from the upper addition value storage section 1008. The additional values corresponding to the upper peripheral area of the 16×16 processing target block 1301 are stored in association with positions (8, 8), (9, 8), (10, 8), and (11, 8) of four blocks in an area 1501. Thus, U(8, 8), U(9, 8), U(10, 8), and U(11, 8) are read from these four positions.

Figure 16:
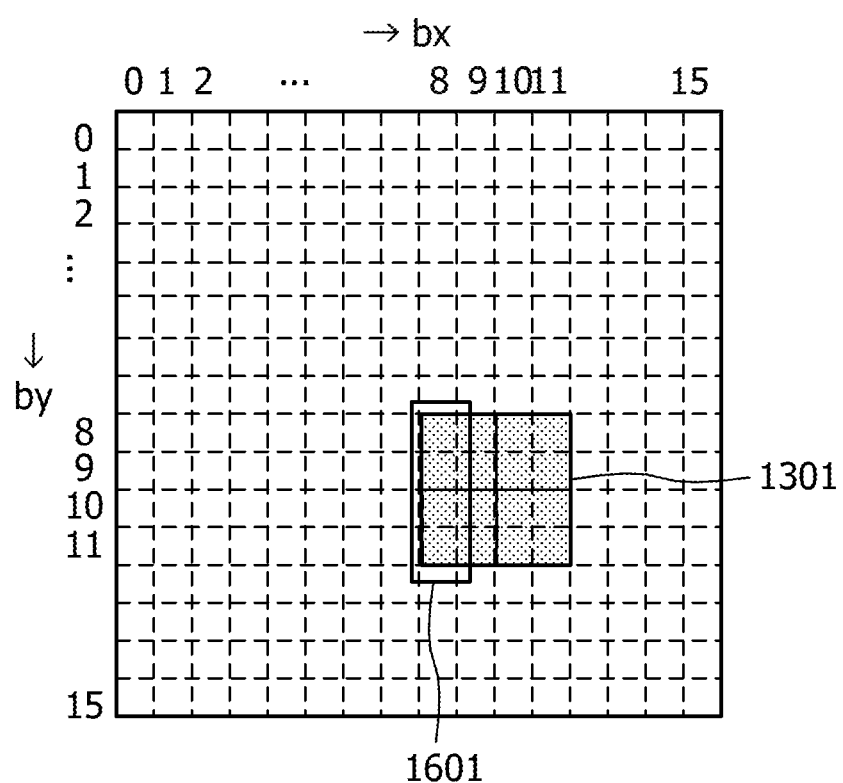
FIG. 16 is a view illustrating a left additional value.

FIG. 16 illustrates an example of the left additional values L(bx, by) read from the left addition value storage section 1007. The additional values corresponding to the left peripheral area of the 16×16 processing target block 1301 are stored in association with positions (8, 8), (8, 9), (8, 10), and (8, 11) of four blocks in an area 1601. Thus, L(8, 8), L(8, 9), L(8, 10), and L(8, 11) are read from these four positions.

The management section 1011 outputs the read k upper additional values U(bx, by) and k left additional values L(bx, by) to the DC cumulation section 1013.

Using the k upper additional values U(bx, by) and the k left additional values L(bx, by), the DC cumulation section 1013 calculates the pixel value DC(X, Y) of the pseudo DC predicted image of the processing target block according to a following equation, and outputs the DC(X, Y) to the SATD calculation section 1014.

$$DC(X,Y)=(\Sigma(i=0 \text{ to } k-1)U(X+i, Y)+\Sigma(i=0 \text{ to } k-1)L(X, Y+i))/(2A+2A) \quad (43)$$

$\Sigma(i=0$ to $k-1)$ in Equation (43) denotes a sum in the range of $i=0$ to $k-1$. DC(X, Y) in Equation (43) corresponds to P[0][0] in Equation (19) and Equation (20). For example, in the case of A=4, the DC cumulation section 1013 may calculate DC(X, Y) according to a following equation.

$$DC(X,Y)=(U(X,Y)+U(X+1,Y)+L(X,Y)+L(X,Y+1)+(8+8-1))/(8+8) \quad (44)$$

A right side (8+8−1) in Equation (44) is added to raise decimals to an integer from a result subtracted by 8+8.

S(X, Y), S(X+1, Y), S(X, Y+1), and S(X+1, Y+1), which are the SATD of the four 4×4 blocks in the processing target block represented by the position (X, Y), are read from the SATD storage section 1005. The management section 1011 outputs the SATD of the read four 4×4 blocks to the comparison section 1015.

The SATD calculation section 1014 calculates S(X, Y) that is the SATD of the processing target block from the Hadamard transformation result H(X, Y) and the pixel value DC(X, Y) of the processing target block according to Equation (19) or Equation (20). Then, the SATD calculation section 1014 outputs the S(X, Y) to the comparison section 1015.

The offset storage section 1016 stores the offset value V in Equation (32). Based on the quantization parameter QP, the comparison section 1015 determines the transformation coefficient $\lambda$ in Equation (32), and reads the offset value V from the offset storage section 1016. Then, using the SATD of the processing target block output from the SATD calculation section 1014, the transformation coefficient $\lambda$, the bit amount R, and the offset value V, the comparison section 1015 calculates a RD cost RDn of the processing target block according to Equation (32).

In the case of A=4, using the SATD of the four 4×4 blocks, which are output from the management section 1011, the transformation coefficient $\lambda$, bit amount R, and the offset value V, the comparison section 1015 calculates the RD cost C of each block according to Equation (32). Then, the comparison section 1015 calculates the RD cost RDd that is a sum of the RD costs C of the four 4×4 blocks.

Next, the comparison section 1015 compares the RD cost RDd with the RD cost RDn, and selects the block size corresponding to the smaller RD cost, as the optimum block size of the PU. Then, the comparison section 1015 stores the selected block size in the PU size storage section 1018, and stores the RD cost C corresponding to the selected block size in the RD cost storage section 1017.

Meanwhile, in the case of A>4, the RD costs C of a plurality of blocks in the processing target block are previously stored in the RD cost storage section 1017. Thus, the comparison section 1015 reads the RD costs C of the blocks from the RD cost storage section 1017, and calculates the RD cost RDd that is a sum of the read RD costs C.

In this case, the block size of the all PUs in the processing target block is not necessarily set to A×A, and may be set to be smaller than A×A. Accordingly, the RD cost RDd is a sum of the RD costs C of four or more blocks in the processing target block.

Next, the comparison section 1015 compares the RD cost RDd with the RD cost RDn, and selects the block size corresponding to the smaller RD cost as the optimum block size of the PU. When the RD cost RDn is smaller than the RD cost RDd, the comparison section 1015 selects the block size 2A×2A, and stores the block size 2A×2A in the PU size storage section 1018. Then, the comparison section 1015 stores the RD cost RDn corresponding to the block size 2A×2A in the RD cost storage section 1017.

Meanwhile, when the RD cost RDd is smaller than the RD cost RDn, the comparison section 1015 selects one or more block size of A×A or smaller. In this case, the selected block size is previously stored in the PU size storage section 1018, and the RD cost C corresponding to the selected block size is previously stored in the RD cost storage section 1017. Accordingly, the comparison section 1015 does not update data in the RD cost storage section 1017 and the PU size storage section 1018.

When the block size 2A×2A of the processing target block reaches a maximum value, the comparison section 1015 outputs the block size stored in each element of the PU size storage section 1018, and outputs the stored block size as the optimum block size of the PU. The comparison section 1015 outputs the RD cost C stored in each element of the RD cost storage section 1017, as the encoding cost corresponding to the optimum block size of the PU.

FIGS. 17A and 17B illustrate an example of the order in which the comparison section 1015 accesses data in the RD cost storage section 1017 and the PU size storage section 1018. In this example, the CTU size of the CTU is 32×32, and the number of 4×4 blocks in the CTU is 8×8.

For example, storage areas of the RD cost storage section 1017 and the PU size storage section 1018 each are a one-dimensional area consisting of a plurality of elements, and these elements are identified by an index I (I=0 to 63) in the Z scan order. Each element stores data of the 4×4 block.

FIG. 17A illustrates, in the case of A=4, an example of the order of accessing 64 pieces of data in units of 8×8 block in the Z scan order. For example, when the 8×8 processing target block corresponds to I=24 ((X, Y)=(4, 2)), the RD cost RDd of the four 4×4 blocks corresponding to I=24 to 27 is compared with the RD cost RDn of the 8×8 processing target block.

Here, when the block size 8×8 of the processing target block is selected, the comparison section 1015 stores the RD cost RDn in four elements corresponding to I=24 to 27 of the RD cost storage section 1017. Then, the comparison section 1015 stores the block size 8×8 in four elements corresponding to I=24 to 27 of the PU size storage section 1018.

Meanwhile, when the block size 4×4 is selected, the comparison section 1015 stores the RD costs C of the four 4×4 blocks in the four elements corresponding to I=24 to 27 of the RD cost storage section 1017. Then, the comparison section 1015 stores the block size 4×4 in the four elements corresponding to I=24 to 27 of the PU size storage section 1018.

In this manner, the RD cost C corresponding to the block size selected by the comparison section 1015 is stored in all of the plurality of elements of the RD cost storage section 1017, which correspond to the 2A×2A processing target block. Similarly, the block size selected by the comparison section 1015 is stored in all of the plurality of elements of the PU size storage section 1018, which corresponds to the 2A×2A processing target block.

Since the comparison section 1015 proceeds processing in the order of A=4, 8, 16, 32, in the case of A>4, data of the area corresponding to the four A×A blocks in the 2A×2A processing target block is previously stored in the RD cost storage section 1017 and the PU size storage section 1018.

Thus, when reading the RD cost C of the area corresponding to the four A×A blocks from the RD cost storage section 1017, the comparison section 1015 accesses each element of the RD cost storage section 1017 from the position (X, Y) of the processing target block according to the index I in the Z scan order. At this time, the comparison section 1015 may use a formula for deriving the index I or a transformation table for access.

FIG. 17B illustrates an example of the order of accessing 64 pieces of data in units of 16×16 block in the Z scan order, in the case of A=8.

The form of the storage areas of the transformation result storage section 1003, the SATD storage section 1005, the left addition value storage section 1007, the upper addition value storage section 1008, the RD cost storage section 1017, and the PU size storage section 1018 is not limited to the embodiments. For example, another form of storage area may be used in terms of memory used amount, throughputs, and access easiness.

As illustrated in FIG. 2, in the intra-prediction encoding, the block size of the PU matches the block size of the CU except for the smallest CU. Meanwhile, for the smallest CU, the block size of the block size of CU or the four-divided CU may be selected as the block size of the PU. The CTU size, the block size of the largest CU, and the block size of the smallest CU may be designated by the syntax.

Thus, when the CTU size is larger than the block size of the largest CU, the PU that is equal to or smaller than the CTU size and is larger than the block size of the largest CU may be excluded from candidates for the optimum PU. Alternatively, such PU may be excluded from targets to be processed by the selection section 801.

When the block size of the smallest PU selected based on the block size of the largest CU is larger than 4×4, the PU that is smaller than the block size of the smallest PU may be excluded from candidates for the optimum PU. Alternatively, such PU may be excluded from targets to be processed by the selection section 801. In this case, the block size of the smallest PU, in place of 4×4, is used as the minimum value of A×A.

Figure 18:
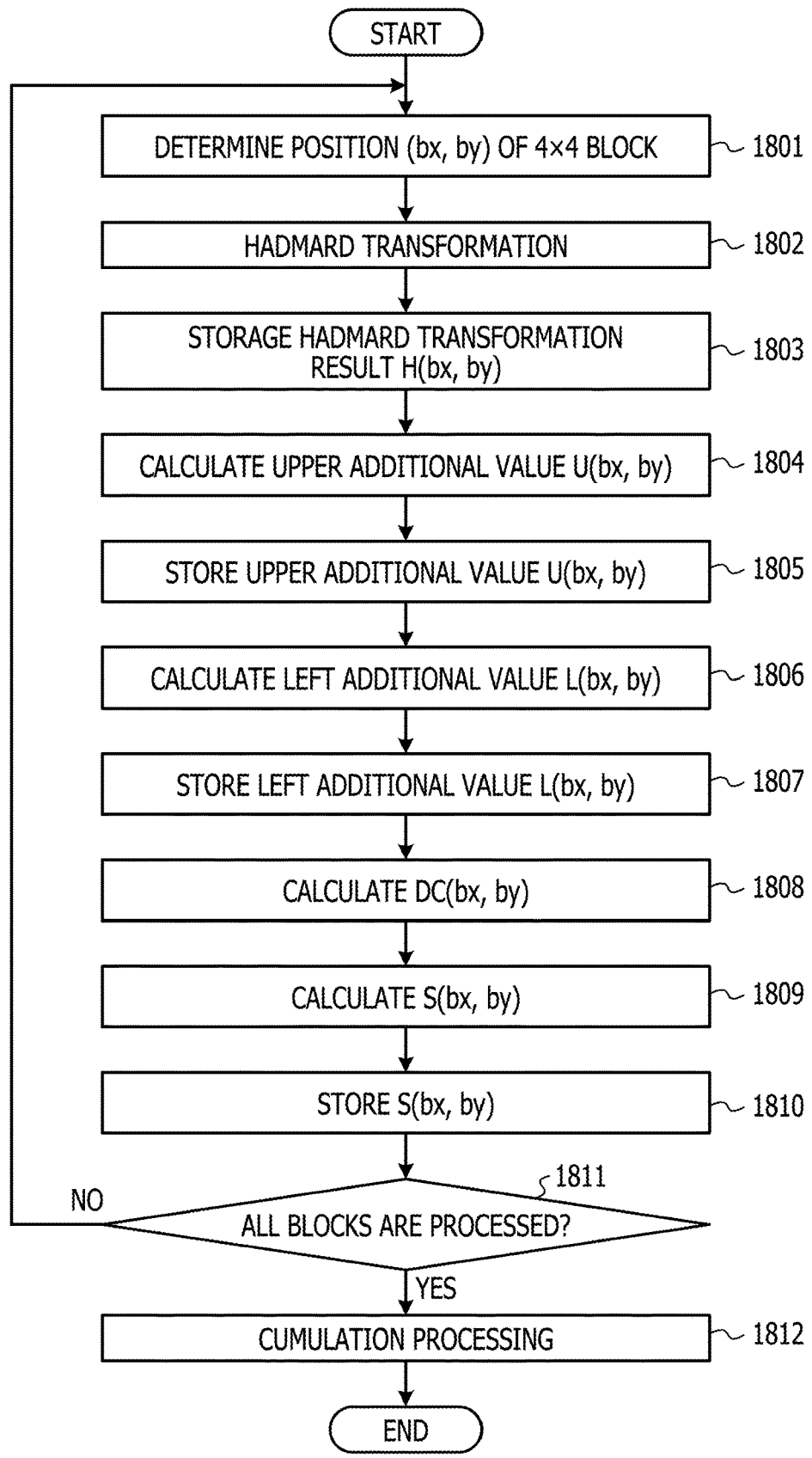
FIG. 18 is a flow chart of block size determination processing.

FIG. 18 is a flow chart of exemplary block size determination processing executed in Step 901 in FIG. 9 by the selection section 801 in FIG. 10. First, the position determination section 1001 determines the position (bx, by) of the 4×4 block in the CTU (Step 1801).

Next, the Hadamard transformation section 1002 performs Hadamard transformation of the 4×4 block corresponding to the position (bx, by) (Step 1802), and stores the Hadamard transformation result H(bx, by) in the transformation result storage section 1003 (Step 1803).

Next, the addition section 1006 calculates the upper additional values U(bx, by) in the upper peripheral area of the 4×4 block corresponding to the position (bx, by) (Step 1804), and stores the upper additional values U(bx, by) in the upper addition value storage section 1008 (Step 1805).

Next, the addition section 1006 calculates the left additional values L(bx, by) in the left peripheral area of 4×4 block corresponding to the position (bx, by) (Step 1806), and stores the left additional values L(bx, by) in the left addition value storage section 1007 (Step 1807).

Next, using the upper additional values U(bx, by) and the left additional values L(bx, by), the DC calculation section 1009 calculates the pixel value DC(bx, by) of the pseudo DC predicted image of the 4×4 block corresponding to the position (bx, by) (Step 1808).

Next, using the Hadamard transformation result H(bx, by) and the pixel value DC(bx, by), the SATD calculation section 1004 calculates S(bx, by) that is the SATD of the 4×4 block corresponding to the position (bx, by) (Step 1809). Then, the SATD calculation section 1004 stores S(bx, by) in the SATD storage section 1005 (Step 1810).

Next, the position determination section 1001 checks whether or not all of 4×4 blocks in the CTU are processed (Step 1811). When any unprocessed block remains (Step 1811, NO), the selection section 801 repeats the processing in Step 1801 and subsequent steps for the next 4×4 block. When all of 4×4 blocks are processed (Step 1811, YES), the selection section 801 executes cumulation processing (Step 1812).

Figure 19:
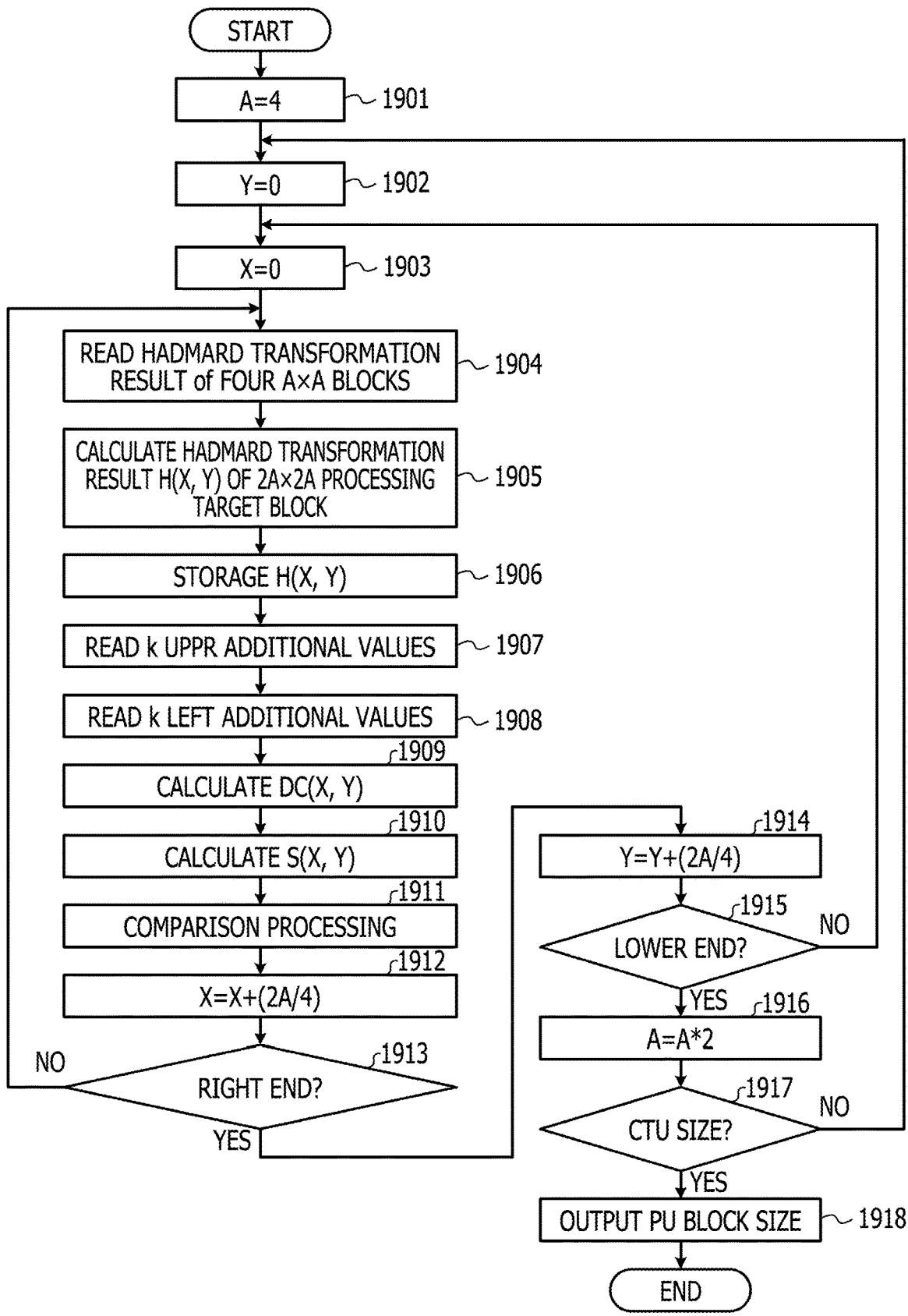
FIG. 19 is a flow chart of cumulation processing.

FIG. 19 is a flow chart of exemplary cumulation processing in Step 1812 in FIG. 18. First, the position calculation section 1010 sets the parameter A to 4 (Step 1901), sets a coordinate Y indicating the position of the 2A×2A processing target block to 0 (Step 1902), and sets a coordinate X indicating the position to 0 (Step 1903).

Next, the management section 1011 reads Hadamard transformation results of four A×A blocks in the processing target block from the transformation result storage section 1003 (Step 1904). Next, using the Hadamard transformation results of the four A×A blocks, the transformation result cumulation section 1012 calculates the Hadamard transformation result H(X, Y) of the processing target block according to Equation (26) to Equation (31) (Step 1905). Then, the management section 1011 stores the Hadamard transformation result H(X, Y) in the transformation result storage section 1003 (Step 1906).

Next, the management section 1011 reads k upper additional values corresponding to the upper peripheral area of the processing target block from the upper addition value storage section 1008 (Step 1907). Next, the management section 1011 reads k left additional values corresponding to the left peripheral area of the processing target block from the left addition value storage section 1007 (Step 1908). Then, using the k upper additional values and the k left additional values, the DC cumulation section 1013 calculates the pixel value DC(X, Y) of the pseudo DC predicted image of the processing target block according to Equation (43) (Step 1909).

Next, the SATD calculation section 1014 calculates S(X, Y) that is the SATD of the processing target block from the Hadamard transformation result H(X, Y) and the pixel value DC(X, Y) of the processing target block according to Equation (19) or Equation (20) (Step 1910). Then, the comparison section 1015 executes comparison processing using S(X, Y) (Step 1911).

Next, the position calculation section 1010 updates X according to X=X+(2A/4) (Step 1912), and checks whether or not X exceeds the right end of the CTU (Step 1913). When X does not exceed the right end of the CTU (Step 1913, NO), the selection section 801 repeats the processing in Step 1904 and subsequent steps based on the updated X.

When X exceeds the right end of the CTU (Step 1913, YES), the position calculation section 1010 updates Y according to Y=Y+(2A/4) (Step 1914), and checks whether or not Y exceeds the lower end of the CTU (Step 1915). When Y does not exceed the lower end of the CTU (Step 1915, NO), the selection section 801 repeats the processing in Step 1903 and subsequent steps based on the updated Y.

When Y exceeds the lower end of the CTU (Step 1915, YES), the position calculation section 1010 updates the parameter A according to A=A*2 (Step 1916), and compares A×A with the CTU size (Step 1917). When A×A is smaller than the CTU size (Step 1917, NO), the selection section 801 repeats the processing in Step 1902 and subsequent steps based on the updated parameter A.

When A×A is CTU size (Step 1917, YES), the comparison section 1015 outputs the block size in each element of the PU size storage section 1018, as the optimum block size of the PU (Step 1918).

Figure 20:
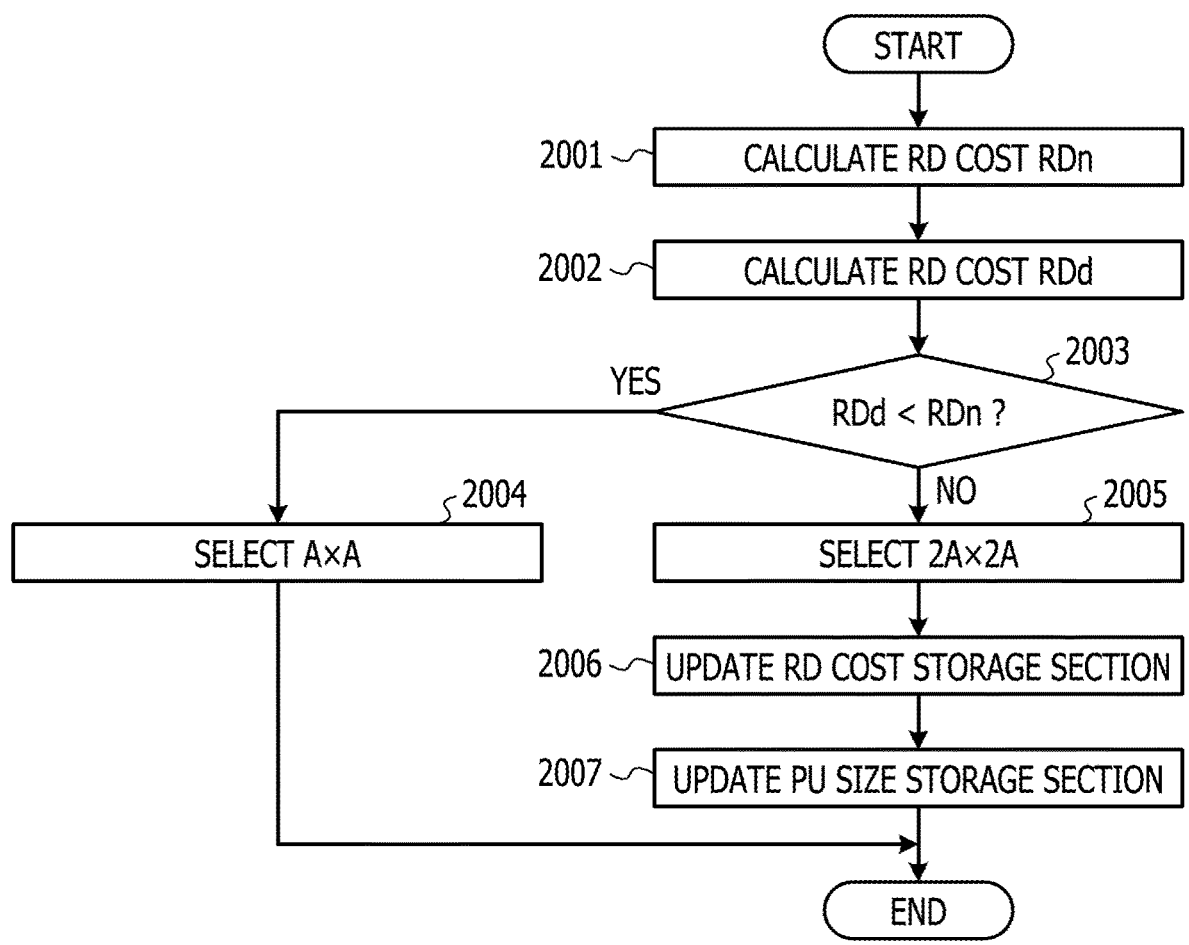
FIG. 20 is a flow chart of comparison processing.

FIG. 20 is a flow chart of comparison processing in Step 1911 in FIG. 19. First, the comparison section 1015 uses the SATD of the processing target block output from the SATD calculation section 1014 to calculate the RD cost RDn of the processing target block according to Equation (32) (Step 2001).

Next, the comparison section 1015 calculates the RD cost RDd of four A×A blocks (Step 2002). In the case of A=4, using the SATD of the four 4×4 blocks, the comparison section 1015 calculates the RD cost C of each block according to Equation (32), and sums the RD costs C to calculate the RD cost RDd.

Meanwhile, in the case of A>4, the comparison section 1015 reads the RD costs C of four or more blocks in the processing target block from the RD cost storage section 1017, and adds the RD costs C to calculate the RD cost RDd.

Next, the comparison section 1015 compares the RD cost RDd with the RD cost RDn (Step 2003). When the RD cost RDd is smaller than the RD cost RDn (Step 2003, YES), the comparison section 1015 selects one or more block sizes corresponding to four A×A blocks (Step 2004).

For example, in the case of A=4, the comparison section 1015 selects the block size 4×4, and the block size is stored in elements of the four 4×4 blocks of the PU size storage section 1018. Then, the comparison section 1015 stores the RD cost C of each 4×4 block in the elements of each block of the RD cost storage section 1017.

Meanwhile, in the case of A>4, the comparison section 1015 selects one or more block sizes previously set in an area corresponding to the four A×A blocks. In this case, the comparison section 1015 does not update data in the RD cost storage section 1017 and the PU size storage section 1018.

When the RD cost RDd is equal to or greater than the RD cost RDn (Step 2003, NO), the comparison section 1015 selects the block size 2A×2A (Step 2005). Next, the comparison section 1015 stores the RD cost RDn in a plurality of elements corresponding to the 2A×2A processing target block of the RD cost storage section 1017, to update data in the RD cost storage section 1017 (Step 2006). Then, the comparison section 1015 stores the block size 2A×2A in the plurality of elements corresponding to the 2A×2A processing target block of the PU size storage section 1018, to update data in the PU size storage section 1018 (Step 2007).

In the case of A>4, in Step 2002, the comparison section 1015 reads one RD cost C for each block of the block size previously set in the processing target block. Then, the comparison section 1015 sums the RD costs C of the plurality of blocks to calculate the RD cost RDd.

FIGS. 21A to 24B illustrate examples of first to fourth simulation results of comparison between the case where HEVC Test Model (HM) determines the block size of the PU and the case where the selection section 801 in FIG. 10 determines the block size of the PU. HM is reference software of the standard organization.

Figure 21A:
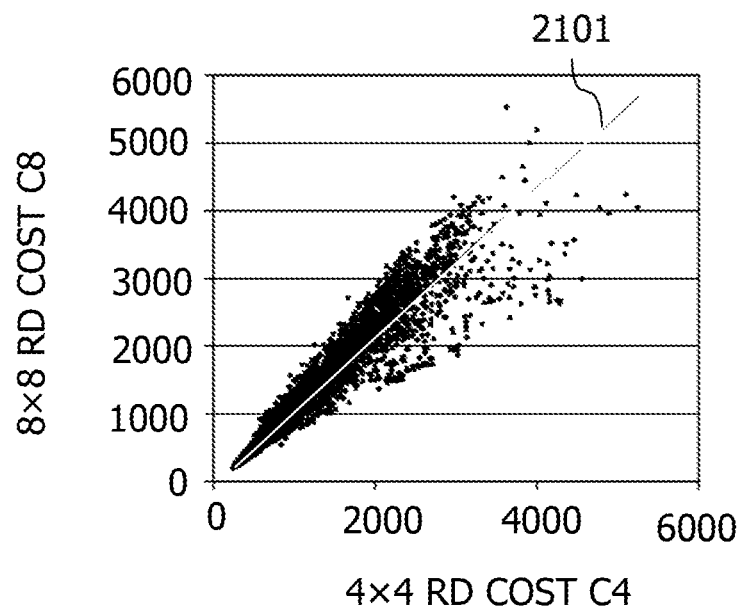
FIGS. 21A and 21B are views illustrating first simulation results.

FIG. 21A illustrates an example of the RD cost calculated by the selection section 801 for one image included in a sample dynamic area #1 in the case where the HM determines the block size of the PU as 8×8. A vertical axis represents an RD cost C8 of the 8×8 block, and a horizontal axis represents an RD cost C4 of four 4×4 blocks in the 8×8 block. Each point representing the combination of the RD cost C4 and the RD cost C8 is plotted for each PU having the block size 8×8 determined by the HM. A straight line 2101 denotes an approximate line that approximates these points.

When the RD cost C8 is smaller than the RD cost C4, like the HM, the selection section 801 determines the block size as 8×8. Meanwhile, when the RD cost C4 is smaller than the RD cost C8, the selection section 801 determines the block size as 4×4 or smaller.

Figure 21B:
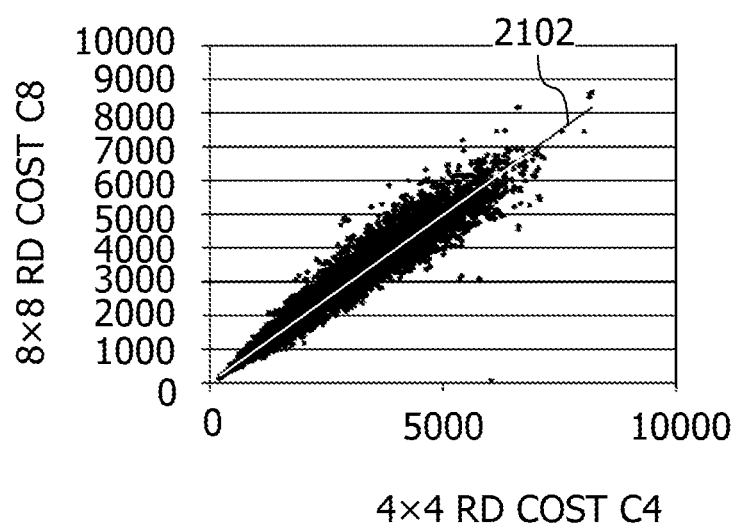

FIG. 21B illustrates an example of the RD cost calculated by the selection section 801 for one image included in a sample dynamic area #2 in the case where the HM determines the block size of the PU as 8×8. As in FIG. 21A, each point representing the combination of the RD cost C4 and the RD cost C8 is plotted for each PU having the block size 8×8 determined by the HM. A straight line 2102 denotes an approximate line that approximates these points.

Figure 22A:
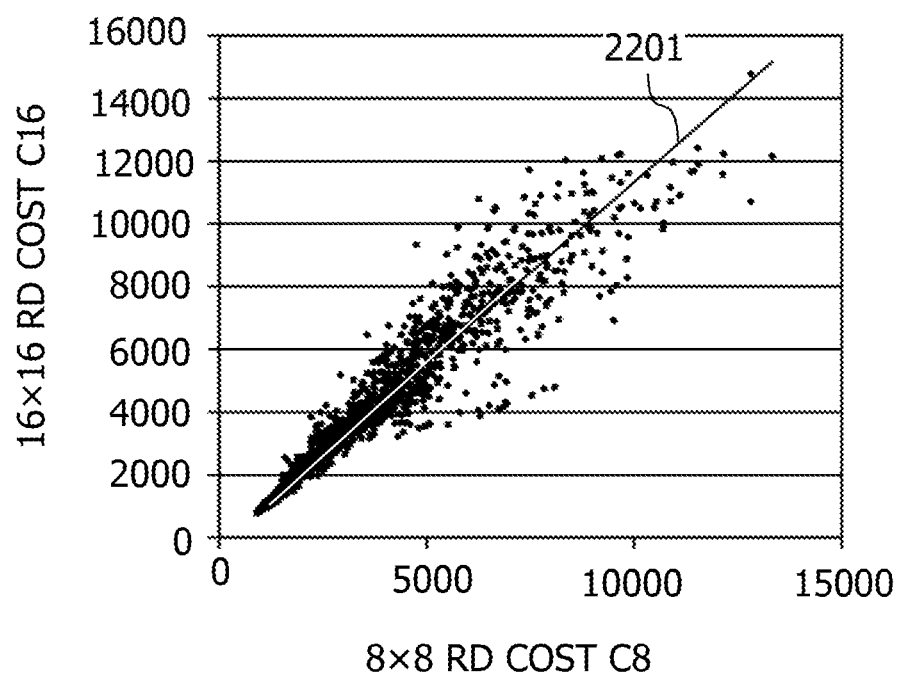
FIGS. 22A and 22B are views illustrating second simulation results.

FIG. 22A illustrates an example of the RD cost calculated by the selection section 801 for one image included in a sample dynamic area #1 in the case where the HM determines the block size of the PU as 16×16. A vertical axis represents an RD cost C16 of the 16×16 block, and horizontal axis represents an RD cost C8 of the four 8×8 blocks in the 16×16 block. Each point representing the combination of the RD cost C8 and the RD cost C16 is plotted for each PU having the block size 16×16 determined by the HM. A straight line 2201 denotes an approximate line that approximates these points.

Figure 22B:
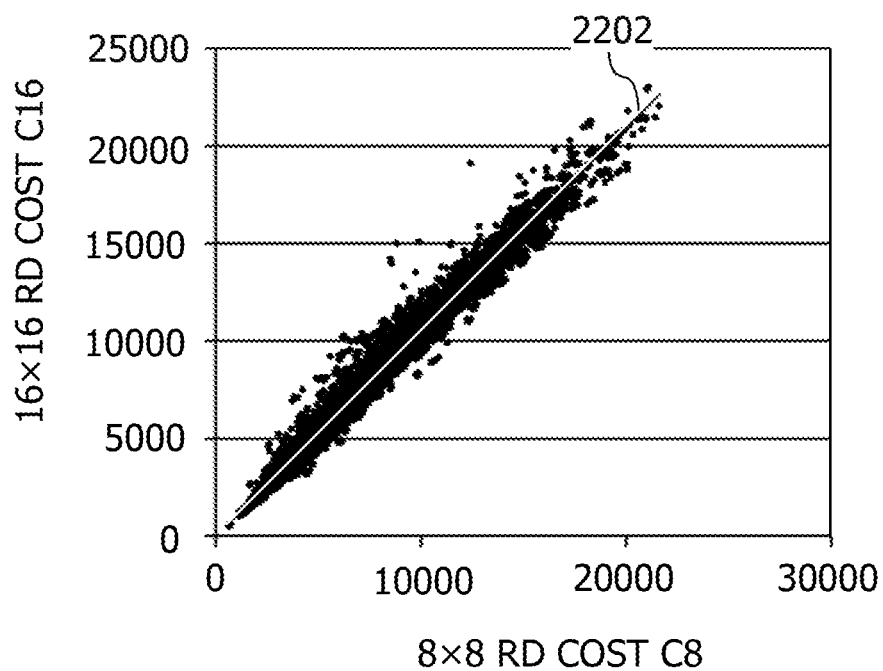

FIG. 22B illustrates an example of the RD cost calculated by the selection section 801 for one image included in the sample dynamic area #2 in the case where the HM determines the block size of the PU as 16×16. As in FIG. 22A, each point representing the combination of the RD cost C8 and the RD cost C16 is plotted for each PU having the block size 16×16 determined by the HM. A straight line 2202 denotes an approximate line that approximates these points.

Figure 23A:
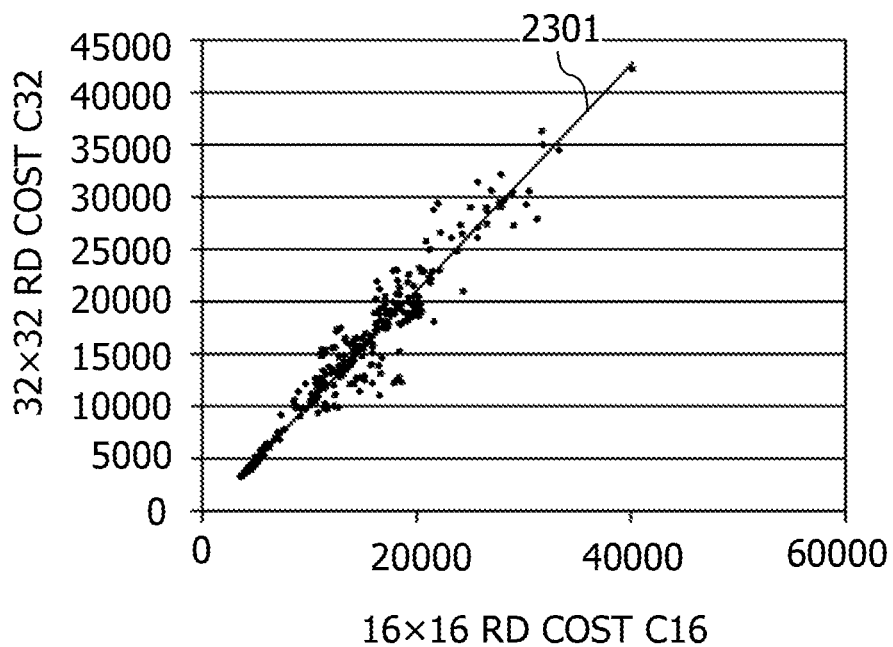
FIGS. 23A and 23B are views illustrating third simulation results.

FIG. 23A illustrates an example of the RD cost calculated by the selection section 801 for one image included in a sample dynamic area #1 in the case where the HM determines the block size of the PU as 32×32. A vertical axis represents an RD cost C32 of the 32×32 block, and a horizontal axis represents an RD cost C16 of the four 16×16 blocks in the 32×32 block. Each point representing the combination of the RD cost C16 and the RD cost C32 is plotted for each PU having the block size 32×32 determined by the HM. A straight line 2301 denotes an approximate line that approximates these points.

Figure 23B:
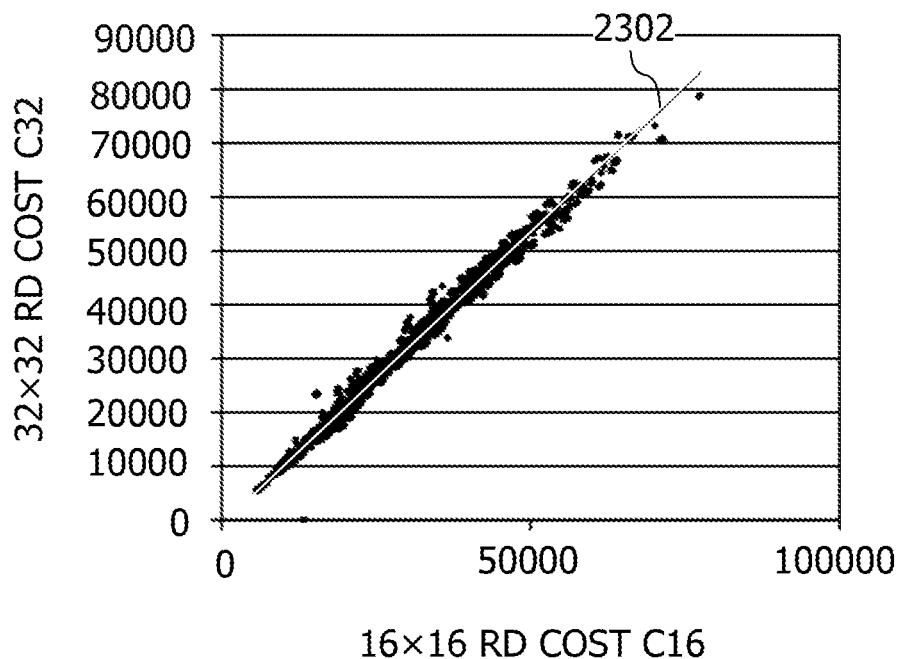

FIG. 23B illustrates an example of the RD cost calculated by the selection section 801 for one image included in the sample dynamic area #2 in the case where the HM determines the block size of the PU as 32×32. As in FIG. 23A, each point representing the combination of the RD cost C16 and the RD cost C32 is plotted for each PU having the block size 32×32 determined by the HM. A straight line 2302 denotes an approximate line that approximates these points.

Figure 24A:
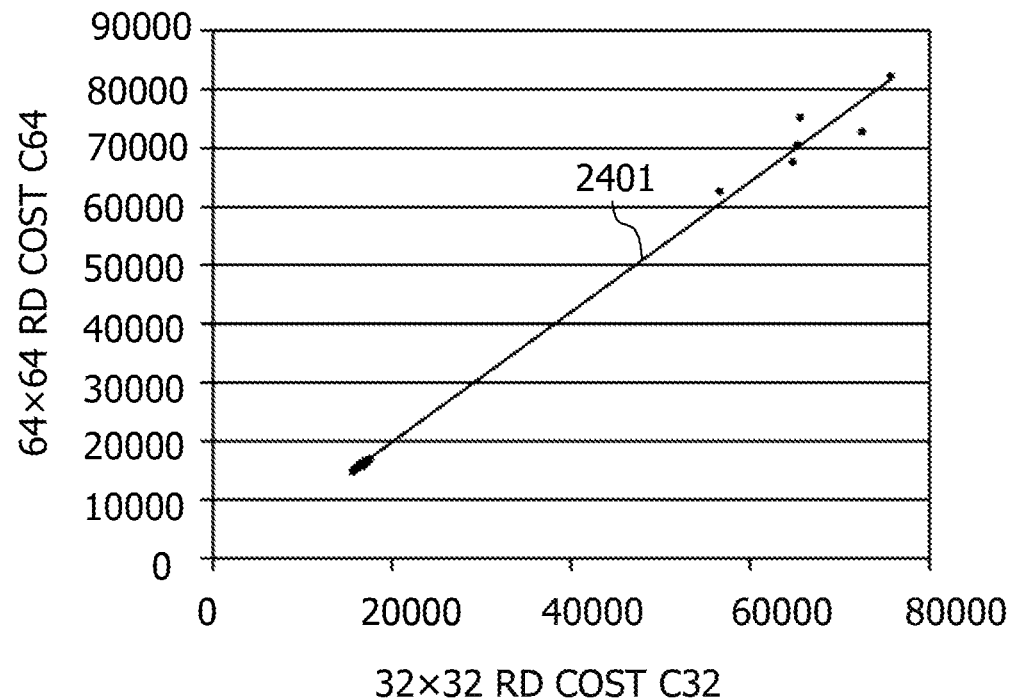
FIGS. 24A and 24B are views illustrating fourth simulation results.

FIG. 24A illustrates an example of the RD cost calculated by the selection section 801 for one image included in the sample dynamic area #1 in the case where the HM determines the block size of the PU as 64×64. A vertical axis represents an RD cost C64 of the 64×64 block, and a horizontal axis represents an RD cost C32 of the four 32×32 blocks in the 64×64 block. Each point representing the combination of the RD cost C32 and the RD cost C64 is plotted for each PU having the block size 64×64 determined by the HM. A straight line 2401 denotes an approximate line that approximates these points.

Figure 24B:
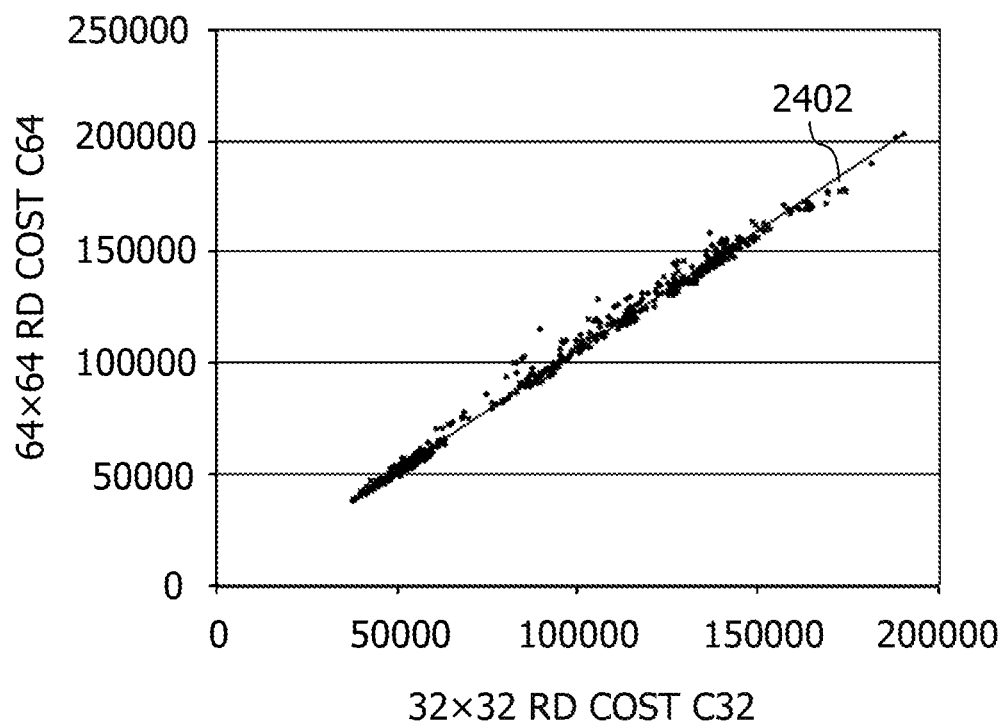

FIG. 24B illustrates an example of the RD cost calculated by the selection section 801 for one image included in the sample dynamic area #2 in the case where the HM determines the block size of the PU as 64×64. As in FIG. 24A, each point representing the combination of the RD cost C32 and the RD cost C64 is plotted for each PU having the block size 64×64 determined by the HM. A straight line 2402 denotes an approximate line that approximates these points.

The simulation results in FIGS. 21A to 24B demonstrate that there is a strong association between the block size of the PU determined by the HM and the block size of the PU determined by the selection section 801. Accordingly, like the HM, the selection section 801 in FIG. 10 may achieve PU division.

Although the moving image encoding apparatus 601 in FIG. 6 uses only the pre-coded original image to generate the pseudo DC predicted image, the moving image encoding apparatus 601 may use a reconfigured image of the encoded CTU to generate the pseudo DC predicted image.

Figure 25:
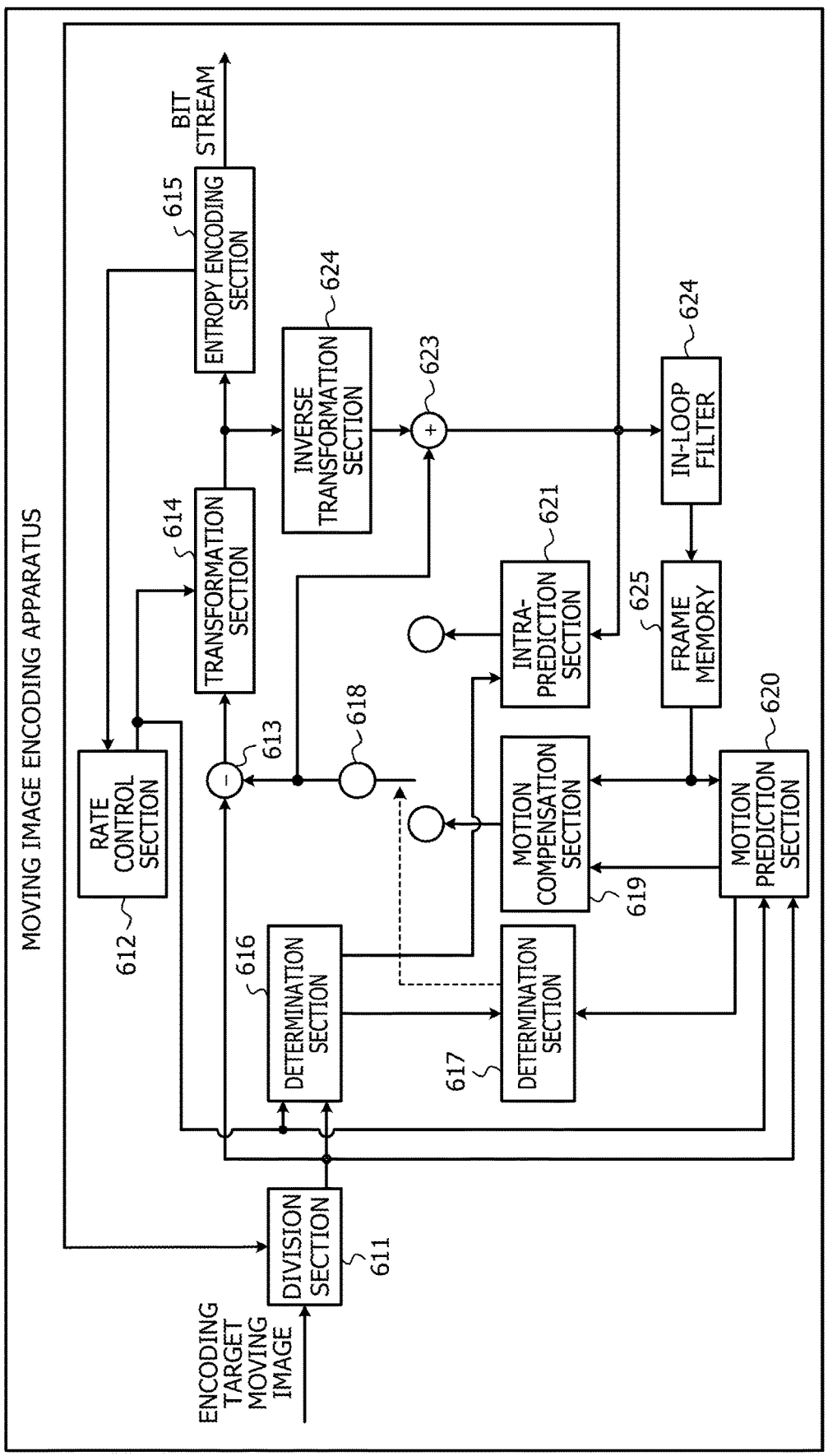
FIG. 25 is a view illustrating a functional configuration of an exemplary moving image encoding apparatus using a reconfigured image.

FIG. 25 illustrates a specific example of the moving image encoding apparatus 401 using the reconfigured image. The moving image encoding apparatus 2501 in FIG. 25 has the same configuration as the configuration of the moving image encoding apparatus 601 in FIG. 6, and the reconfiguration section 623 outputs an unfiltered reconfigured image to the determination section 616.

In this case, the reconfigured image is input to the addition section 1006 in FIG. 10. When the position (bx, by) in the CTU original image corresponds to an upper boundary of the CTU, the addition section 1006 uses the pixel value of the reconfigured image of the adjacent encoded CTU on the upper side as the pixel value of the upper peripheral area of the 4×4 block to calculate the upper additional value U(bx, by). When the position (bx, by) corresponds to a left boundary of the CTU, the addition section 1006 uses the pixel value of the reconfigured image of the adjacent encoded CTU on the left side as the pixel value of the left peripheral area of the 4×4 block to calculate the left additional value L(bx, by).

Accordingly, the DC calculation section 1009 and the DC cumulation section 1013 may use the reconfigured image of the encoded CTU to calculate the pixel value of the pseudo DC predicted image.

The configurations of the moving image encoding apparatus in FIGS. 4, 6, and 25 are only examples, and any constituent may be omitted or changed according to applications or conditions of the moving image encoding apparatuses. The configuration of the determination section 616 in FIG. 8 is only an example, and any constituent may be omitted or changed according to applications or conditions of the moving image encoding apparatus. The configuration of the selection section 801 in FIG. 10 is only an example, and any constituent may be omitted or changed according to applications or conditions of the moving image encoding apparatus.

The flow charts in FIGS. 5, 7, 9, and 18 to 20 are only examples, and any processing may be omitted or changed according to the configuration or conditions of the moving image encoding apparatus. The moving image encoding apparatus may use any standard of the moving image encoding other than the HEVC to execute the moving image encoding processing, or may use any predicted image other than the DC predicted image to calculate the encoding cost. The moving image encoding apparatus may use any encoding cost other than the RD cost based on the SATD to determine the block size of the PU in the intra-prediction encoding.

The quadtree division in FIG. 1, the PU in FIG. 2, and the method of evaluating the RD cost in FIG. 3 are only examples, and other types of block division may be used according to the employed standard of the moving image encoding. The position of the 4×4 block in FIG. 11, the upper peripheral area and the left peripheral area in FIG. 12, the position of the processing target block in FIG. 13, the number of additional values in FIG. 14, the upper additional value in FIG. 15, the left additional value in FIG. 16, and the access order in FIG. 17 are only examples. Other variables and areas may be used according to the employed standard of the moving image encoding.

The simulation results in FIGS. 21A to 24B are merely examples, and vary depending on the encoding target moving image.

Equation (1) to Equation (44) are only examples, and other formulas may be used according to a configuration or a condition of the moving image encoding apparatus.

Figure 26:
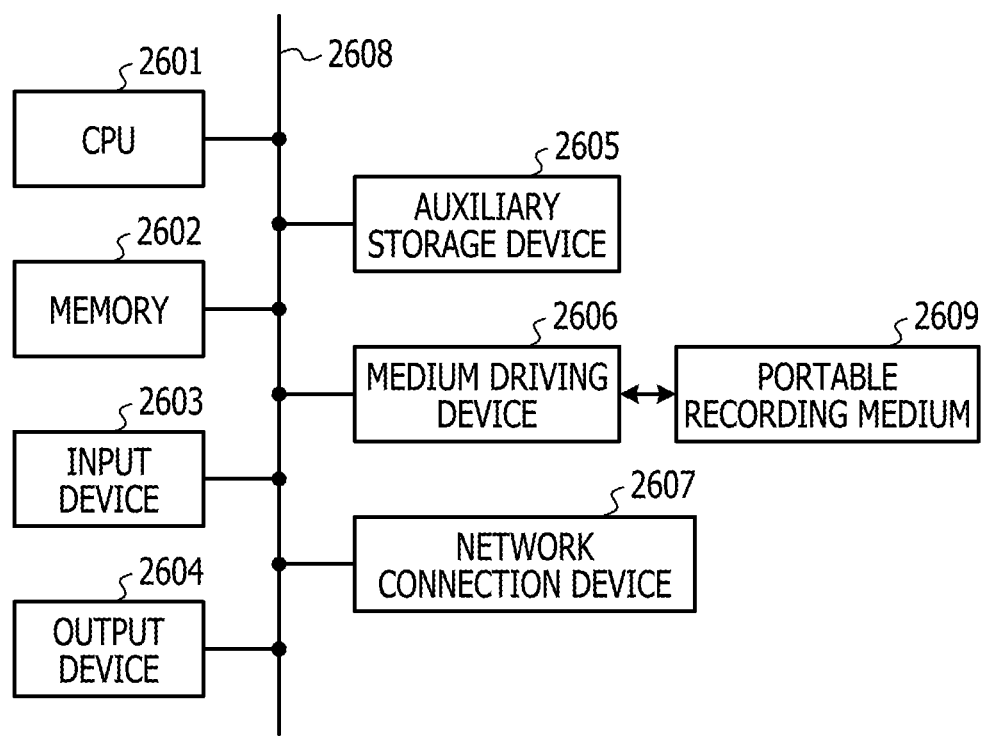
FIG. 26 is a view illustrating a configuration of an information processor.

The moving image encoding apparatuses in FIGS. 4, 6, and 25 each may be implemented as a hardware circuit or an information processor (computer) as illustrated in FIG. 26.

The information processor in FIG. 26 includes a central processing unit (CPU) 2601, a memory 2602, an input device 2603, an output device 2604, an auxiliary storage device 2605, a medium driving device 2606, and a network connection device 2607. These constituents are interconnected via a bus 2608.

The memory 2602 is a semiconductor memory such as a read only memory (ROM), a random access memory (RAM), and a flash memory, and stores a program and data used in the moving image encoding processing. The memory 2602 may be used as the frame memory 625 in FIGS. 6 and 25. The memory 2602 may be used as the transformation result storage section 1003, the SATD storage section 1005, the left addition value storage section 1007, the upper addition value storage section 1008, the offset storage section 1016, the RD cost storage section 1017, and the PU size storage section 1018 in FIG. 10.

For example, the CPU 2601 (processor) runs a program using the memory 2602, thereby operating as the selection section 411, the determination section 412, the intra-prediction section 413, and the encoding section 414 in FIG. 4.

The CPU 2601 runs a program using the memory 2602, thereby also operating as the division section 611, the rate control section 612, the difference generation section 613, the transformation section 614, the entropy encoding section 615, the determination section 616, and the determination section 617 in FIG. 6. The CPU 2601 runs a program using the memory 2602, thereby also operating as the switch 618, the motion compensation section 619, the motion prediction section 620, intra-prediction section 621, the inverse transformation section 622, the reconfiguration section 623, and the in-loop filter 624.

The CPU 2601 runs a program using the memory 2602, thereby also operating as the selection section 801, the brightness mode determination section 802, the color-difference mode determination section 803, the brightness size determination section 804, and the color-difference size determination section 805 in FIG. 8.

The CPU 2601 runs a program using the memory 2602, thereby also operating as the position determination section 1001, the Hadamard transformation section 1002, the SATD calculation section 1004, the addition section 1006, and the DC calculation section 1009 in FIG. 10. The CPU 2601 runs a program using the memory 2602, thereby also operating as the position calculation section 1010, the management section 1011, the transformation result cumulation section 1012, the DC cumulation section 1013, the SATD calculation section 1014, and the comparison section 1015.

Examples of the input device 2603 include a keyboard and a pointing device, and the input device 2603 is used to receive inputs of instructions or information from the user or operator. Examples of the output device 2604 include a display, a printer, and a speaker, and the output device 2604 is used to output inquiries and processing results to the user or operator.

The auxiliary storage device 2605 may be a magnetic disc device, an optical disc device, a magneto-optical disc device, a tape device, or the like. The auxiliary storage device 2605 may be a hard disc drive or a flash memory. The information processor may store a program and data in the auxiliary storage device 2605, and load the program and data into the memory 2602 to use them.

The medium driving device 2606 drives a portable recording medium 2609, and accesses contents in the portable recording medium 2609. Examples of the portable recording medium 2609 include a memory device, a flexible disc, an optical disc, and a magneto-optical disc. The portable recording medium 2609 may be a compact disk read only memory (CD-ROM), a digital versatile disk (DVD), or a Universal Serial Bus (USB). The user or operator may store the program and data in the portable recording medium 2609, and load the program and data into the memory 2602 and use them.

Examples of such computer-readable recording medium that stores the program and data used for the processing include a physical (non-temporary) recording medium such as the memory 2602, the auxiliary storage device 2605, and the portable recording medium 2609.

The network connection device 2607 is a communication interface circuit that is connected to a communication network such as local area network (LAN) and the Internet, and converts data in communication. The network connection device 2607 may transmit the bit stream to the moving image decoding apparatus. The information processor may receive the program and data from an external device via the network connection device 2607, load the program and data into the memory 2602 and use them.

The information processor does not necessarily have all constituents illustrated in FIG. 26, and may omit any constituent according to applications and conditions. For example, when an interface with the user or operator is unnecessary, the input device 2603 and the output device 2604 may be omitted. When the information processor does not access the portable recording medium 2609, the medium driving device 2606 may be omitted.

Although the embodiments of the present disclosure and their advantages have been described in detail, those ordinarily skilled in the art could make various changes, additions and omissions without deviating from the scope of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A moving image encoding apparatus comprising:
one or more memories; and
one or more processors coupled to the one or more memories and the one or more processors configured to:
calculate encoding costs regarding each of a plurality of blocks having different block sizes based on differences between original images of the plurality of blocks and specific prediction images of the plurality of blocks respectively wherein the plurality of blocks is defined by recursively dividing an encoding target image included in a moving image in each of a plurality of hierarchies, perform a selection of a first block size in a first hierarchy among the plurality of hierarchies by comparing the encoding costs with each other, perform a selection of a first intra-prediction mode for a first block having the first block size in the first hierarchy, and encode the first block based on a difference between a first prediction image of the first block generated by the first intra-prediction mode and a first original image of the first block, a pixel value of a first specific prediction image of the first block is an average value of pixel values of a first plurality of pixels adjacent to the first block, and a first encoding cost of the first block includes a sum of absolute values of a first transformation result acquired by transforming a difference between the first original image and the first specific prediction image by Hadamard transformation, the selection of the block size includes: calculating the first transformation result based on a second transformation result acquired by transforming a second original image of a second block by Hadamard transformation, the second block has a smaller block size than the first block and is included in the first block, calculating another average value of pixel values of a second plurality of pixels adjacent to the second block, calculating the first encoding cost of the first block by using the first transformation result and the other average value, and selecting the first block as the first block size in the first hierarchy when the first encoding cost is smaller than a second encoding cost of the second block.

2. The moving image encoding apparatus according to claim 1, wherein the first plurality of pixels includes both pixels adjacent to the first block on an upper side and pixels adjacent to the first block on a left side.

3. The moving image encoding apparatus according to claim 1, wherein the selection of the first intra-prediction modes includes calculating a plurality of encoding costs corresponding to a plurality of intra-prediction modes, and selecting the first intra-prediction mode based on the plurality of encoding costs.

4. The moving image encoding apparatus according to claim 3, wherein in the selection of the first block size in the first hierarchy, at least one of the plurality of encoding costs corresponding to the plurality of intra-prediction modes is not calculated.

5. A moving image encoding method comprising: calculating encoding costs regarding each of a plurality of blocks having different block sizes based on differences between original images of the plurality of blocks and specific prediction images of the plurality of blocks respectively wherein the plurality of blocks is defined by recursively dividing an encoding target image included in a moving image in each of a plurality of hierarchies; selecting a first block size in a first hierarchy among the plurality of hierarchies by comparing the encoding costs with each other, selecting a first intra-prediction mode for a first block having the first block size in the first hierarchy, and encoding the first block based on a difference between a first prediction image of the first block generated by the first intra-prediction mode and a first original image of the first block, a pixel value of a first specific prediction image of the first block is an average value of pixel values of a first plurality of pixels adjacent to the first block, and a first encoding cost of the first block includes a sum of absolute values of a first transformation result acquired by transforming a difference between the first original image and the first specific prediction image by Hadamard transformation, the selecting the block size includes: calculating the first transformation result based on a second transformation result acquired by transforming a second original image of a second block by Hadamard transformation wherein the second block has a smaller block size than the first block and is included in the first block, calculating another average value of pixel values of a second plurality of pixels adjacent to the second block, calculating the first encoding cost of the first block by using the first transformation result and the other average value, and selecting the first block as the first block size in the first hierarchy when the first encoding cost is smaller than a second encoding cost of the second block.

6. The moving image encoding method according to claim 5, wherein the first plurality of pixels includes both pixels adjacent to the first block on an upper side and pixels adjacent to the first block on a left side.

7. The moving image encoding method according to claim 5, wherein the selecting the first intra-prediction modes includes calculating a plurality of encoding costs corresponding to a plurality of intra-prediction modes, and selecting the first intra-prediction mode based on the plurality of encoding costs.

8. The moving image encoding method according to claim 7, wherein in the selecting the first block size in the first hierarchy, at least one of the plurality of encoding costs corresponding to the plurality of intra-prediction modes is not calculated.

9. A non-transitory computer-readable medium storing a moving image encoding program executable by a computer, the program comprising:

instructions for calculating encoding costs regarding each of a plurality of blocks having different block sizes based on differences between original images of the plurality of blocks and specific prediction images of the plurality of blocks respectively wherein the plurality of blocks is defined by recursively dividing an encoding target image included in a moving image in each of a plurality of hierarchies;

instructions for selecting a first block size in a first hierarchy among the plurality of hierarchies by comparing the encoding costs with each other, instructions for selecting a first intra-prediction mode for a first block having the first block size in the first hierarchy; and instructions for encoding the first block based on a difference between a first prediction image of the first block generated by the first intra-prediction mode and a first original image of the first block, a pixel value of a first specific prediction image of the first block is an average value of pixel values of a first plurality of pixels adjacent to the first block, and a first encoding cost of the first block includes a sum of absolute values of a first transformation result acquired by transforming a difference between the first original image and the first specific prediction image by Hadamard transformation, the selecting the block size includes: calculating the first transformation result based on a second transformation result acquired by transforming a second original image of a second block by Hadamard transformation wherein the second block has a smaller block size than the first block and is included in the first block, calculating another average value of pixel values of a second plurality of pixels adjacent to the second block, calculating the first encoding cost of the first block by using the first transformation result and the other average value, and selecting the first block as the first block size in the first hierarchy when the first encoding cost is smaller than a second encoding cost of the second block.

10. The medium according to claim 9, wherein the first plurality of pixels includes both pixels adjacent to the first block on an upper side and pixels adjacent to the first block on a left side.

11. The medium according to claim 9, wherein the selecting the first intra-prediction modes includes calculating a plurality of encoding costs corresponding to a plurality of intra-prediction modes, and selecting the first intra-prediction mode based on the plurality of encoding costs.

12. The medium according to claim 11, wherein in the selecting the first block size in the first hierarchy, at least one of the plurality of encoding costs corresponding to the plurality of intra-prediction modes is not calculated.

* * * * *